US012571730B2

(12) United States Patent
Yehl et al.

(10) Patent No.: US 12,571,730 B2
(45) Date of Patent: Mar. 10, 2026

(54) LABEL-FREE BACTERIAL DETECTION

(71) Applicant: MIAMI UNIVERSITY, Oxford, OH (US)

(72) Inventors: Kevin Yehl, Dry Ridge, KY (US); Patrick Needham, Oxford, OH (US)

(73) Assignee: Miami University, Oxford, OH (US)

(*) Notice: Subject to any disclaimer, the term of this patent is extended or adjusted under 35 U.S.C. 154(b) by 260 days.

(21) Appl. No.: 18/455,390

(22) Filed: Aug. 24, 2023

(65) Prior Publication Data

US 2024/0068941 A1 Feb. 29, 2024

Related U.S. Application Data

(60) Provisional application No. 63/400,603, filed on Aug. 24, 2022.

(51) Int. Cl.
*G01N 21/45* (2006.01)

(52) U.S. Cl.
CPC ....... *G01N 21/45* (2013.01); *G01N 2021/458* (2013.01)

(58) Field of Classification Search
CPC ............. G01N 21/45; G01N 2021/458; G01N 21/7703; G01N 2021/772; G01N 2021/7779
See application file for complete search history.

(56) References Cited

U.S. PATENT DOCUMENTS

| | | | | |
|---|---|---|---|---|
| 4,240,751 | A * | 12/1980 | Linnecke ........... | G01N 33/5302 422/942 |
| 5,629,214 | A * | 5/1997 | Crosby ............ | G01N 33/54366 436/805 |
| 7,070,987 | B2 | 7/2006 | Cunningham et al. | |
| 7,300,803 | B2 | 11/2007 | Lin et al. | |
| 8,111,401 | B2 * | 2/2012 | Magnusson .......... | G01N 21/253 356/480 |
| 8,514,391 | B2 * | 8/2013 | Wawro ..................... | G02B 6/34 385/12 |

(Continued)

FOREIGN PATENT DOCUMENTS

| | | | | |
|---|---|---|---|---|
| JP | 2005003561 A * | 1/2005 | ............. | G01N 21/77 |
| WO | WO-2024186532 A1 * | 9/2024 | ....... | G01N 33/56983 |

OTHER PUBLICATIONS

Leonard et al. "Unraveling Antimicrobial Susceptibility of Bacterial Networks on Micropillar Architectures Using Intrinsic Phase-Shift Spectroscopy", 2017, ACSNano , 11, 6167.*

(Continued)

*Primary Examiner* — Mohamed K Amara
(74) *Attorney, Agent, or Firm* — Calfee, Halter & Griswold LLP

(57) ABSTRACT

Disclosed herein are systems and methods for quantifying bacteriophage virulence, measuring phage-host dynamics and parameters, including phage-host range, phage interactions with biological samples and with immune systems, and label-free bacterial detection/diagnostics, that are amenable to automation, high-throughput, and functional in complex media. In some embodiments, a label-free interferometry system transduces the light reflected by a sensor and any molecules attached thereto to a real-time signal comprising a sensorgram from which infectivity parameters such as binding kinetics and lysis time can be derived.

20 Claims, 37 Drawing Sheets

(56) References Cited

U.S. PATENT DOCUMENTS

| | | | | |
|---|---|---|---|---|
| 8,580,578 | B2 | 11/2013 | Cunningham et al. | |
| 8,865,078 | B2 * | 10/2014 | Chiou | G01N 21/6486 435/6.12 |
| 9,273,949 | B2 * | 3/2016 | Bornhop | G01N 21/45 |
| 9,482,615 | B2 * | 11/2016 | Chiou | G01N 21/6454 |
| 10,261,013 | B2 * | 4/2019 | Bornhop | G01B 9/02001 |
| 10,627,396 | B2 * | 4/2020 | Bornhop | G01N 33/536 |
| 2002/0012930 | A1 * | 1/2002 | Rothberg | G01N 21/6452 435/8 |
| 2003/0003599 | A1 * | 1/2003 | Wagner | B82Y 5/00 506/26 |
| 2003/0017580 | A1 * | 1/2003 | Cunningham | G01N 21/7743 427/2.11 |

OTHER PUBLICATIONS

Maldonao et al. "Ultrasensitive Label-Free Detection of Unamplified Multidrug-Resistance Bacteria Genes with a Bimodal Waveguide Interferometric Biosensor", 2020, Diagonastics, 10: 845.*

Murray, C.J., et al., "Global Burden of Bacterial Antimicrobial Resistance in 2019: A Systematic Analysis", Feb. 12, 2022, pp. 629-655, vol. 399, www.thelancet.com.

Centers for Disease Control and Prevention, "Antibiotic Resistance Threats in the United States", 2019, pp. 1-14, https://www.hhs.gov/sites/default/files/michael-craig-cdc-talk-thursday-am-508.pdf.

Vikesland, P. et al., "Differential Drivers of Antimicrobial Resistance across the World", Acc. Chem. Res. 52, 916-924, DOI: 10.1021/acs.accounts.8b00643 (2019).

Zhang, Z. et al., "Assessment of Global Health Risk of Antibiotic Resistance Genes", Nature Communications. 13, 1-11, DOI: 10.1038/s41467-022-29283-8 (2022).

Cook, M.A., et al., "The past, present, and future of antibiotics" Sci. Transl. Med. 14, DOI: 10.1126/SCITRANSLMED.ABO7793 (2022).

Hutchings, M., et al., "Antibiotics: past, present and future". Curr. Opin. Microbiol. 51, 72-80, DOI: 10.1016/J.MIB.2019.10.008 (2019).

Storms, Z.J., et al., "The Virulence Index: A Metric for Quantitative Analysis of Phage Virulence", PHAGE: Therapy, Applications, and Research. 1, 27, DOI: 10.1089/PHAGE.2019.0001 (2020).

Konopacki, M., et al., "PhageScore: A simple method for comparative evaluation of bacteriophages lytic activity", Biochem. Eng. J. 161, 107652, DOI: 10.1016/J.BEJ.2020.107652 (2020).

Henry M., et al., "Development of a high throughput assay for indirectly measuring phage growth using the OmniLogTM system", Bacteriophage. 2, 159, DOI: 10.4161/BACT.21440 (2012).

Egido, J.E., et al., "Monitoring phage-induced lysis of gram-negatives in real time using a fluorescent DNA dye", Scientific Reports. 13, 1-12, DOI: 10.1038/s41598-023-27734-w (2023).

Hu, B., et al., "The bacteriophage T7 virion undergoes extensive structural remodeling during infection", Science. 339, 576-579, DOI: 10.1126/science.1231887 (2013).

Mandal, P.K., et al., "Bacteriophage infection of *Escherichia coli* leads to the formation of membrane vesicles via both explosive cell lysis and membrane blebbing", Microbiology. 167, 1021, DOI: 10.1099/MIC.0.001021 (2021).

Kiss, B., et al. "Imaging the Infection Cycle of T7 at the Single Virion Level", Int. J. Mol. Sci. 23, 11252, DOI: https://doi.org/10.3390/ijms231911252 (2022).

Xiao Liu et al., "Rapid and sensitive detection of *Staphylococcus aureus* using biolayer interferometry technology combined with phage lysin LysGH15", Biosensors and Bioelectronics, vol. 198, (2022) 113799, ISSN 0956-5663, https://doi.org/10.1016/j.bios.2021.113799.

Anneta Razatos et al., "Molecular determinants of bacterial adhesion monitored by atomic force microscopy", Applied Biological Sciences, Proc. Natl. Acad. Sci. USA, vol. 95 pp. 11059-11064 (Sep. 1998.).

N. B. Hubbs et al., "Kinetic analysis of bacteriophage Sf6 binding to outer membrane protein a using whole virions" bioRxiv (2019): 509141.

* cited by examiner

LABEL-FREE BACTERIAL DETECTION

CROSS REFERENCE TO RELATED APPLICATIONS

This application claims the benefit of U.S. Provisional Application No. 63/400,603, filed on Aug. 24, 2022, the entire contents of which is hereby incorporated by reference.

TECHNICAL FIELD

The general inventive concepts relate to systems and methods for quantifying bacteriophage virulence, measuring phage-host dynamics and parameters, and bacterial detection/diagnostics and, more specifically, to label-free bacterial detection and analysis.

BACKGROUND

Antibiotic resistance is an urgent public health threat, resulting in approximately five million annual deaths worldwide. In the United States alone, there are approximately three million infections per year, causing 35,000 deaths per year. The incidence of antibiotic-resistant infections is growing due to a complex combination of factors: over prescription and misuse of antibiotics, industrial-scale application of antibiotics in livestock, and globalization increasing the spread of antibiotic-resistant pathogens. The current standard of care for treating antibiotic-resistant infections is treatment with other stronger types of antibiotics. Typically, these classes of antibiotics are administered intravenously and are more toxic than first line of defense antibiotics. This is problematic for patients in poor health, who are also typically the most vulnerable to bacterial infections. In cases where the last line of defense antibiotic fails, the patient must often undergo surgical removal of infection, battle recurring infections, or even succumb to infection.

As a result, alternative treatment options are being developed such as phage therapy, which is the application of bacteriophage ("phage") viruses to treat bacterial infections. Phage therapy is advantageous because it can be targeted to specific bacterial species or strains and therefore is able to only infect pathogenic strains of bacteria and prevent dysbiosis, it is insensitive to antibiotic resistance so it can treat multi-drug resistant infections, and it can be genetically engineered to enhance antimicrobial activity or combat resistance to phage therapy.

Due to its narrow host range and to treat polyclonal infections or to minimize resistance development, phage therapy is administered as a mixture of different phage types. This mixture can be formulated as a predefined mixture of phages targeting a broad collection of pathogenic isolates (known as a "universal cocktail"), or as a personalized mixture of phages tailored to the infective pathogen(s) (known as a "personalized cocktail"). Personalized phage therapy can be more effective because all phages in the therapy are active against the infectious pathogen. Additionally, personalized phage therapy minimizes the number of phage types in the mixture, thus reducing potential immunogenic side effects.

Nevertheless, this personalized therapy strategy requires the identification of phages able to infect the pathogen of interest. Traditionally, this is achieved through the microbiology double-layer agar ("DLA") assay, where phage suspensions are spotted onto bacterial agar plates or "lawns" at varying dilutions. Upon phage replication and lysis, a translucent spot is formed and counted to quantify the number of infective viral particles, called plaque-forming units ("PFU"). This classical microbiology assay is labor-intensive, is not amenable to automation for high-throughput screening, and it is time-consuming as it requires overnight cultures of bacteria and phage growth. It also cannot capture phage-host dynamics, such as infectivity parameters. Furthermore, DLA is limited to agar plates, which do not ideally recapitulate infection conditions. There is therefore a major need to maximize the effectiveness of phage therapies.

SUMMARY

The general inventive concepts are based, in part, on the discovery that interferometry can be harnessed according to and along with the inventive concepts herein to detect the presence of pathogens, quantify phage virulence, and measure one or more phage-host dynamics and parameters, including screening for phage-host compatibility, leading to improved therapeutic interventions. The general inventive concepts are amenable to automation, high-throughput, label-free, and functional in complex media.

Disclosed herein are systems and methods for detecting and studying phage-host dynamics and parameters, including detecting and quantifying phage virulence and phage host-range, detecting and studying phage interactions in and with biological samples, including mammal and human biological samples, and with immune systems, that are amenable to automation, high-throughput, and are functional in complex media, including systems and methods to develop companion diagnostics that can quickly identify efficacious phages, quantify phage virulence and phage host-range, measure phage-host dynamics and parameters, and that are amenable to automation and scale-up.

In one exemplary embodiment, a method for measuring phage-host dynamics and parameters using bacteriophage infection of a bacteria is provided. The method includes the steps of providing a sensor with a tip and attaching and immobilizing to the sensor a plurality of bacteriophages having a phage-host range to obtain a functionalized sensor. The method further includes the steps of irradiating the functionalized sensor with light and detecting and obtaining in real-time an at least one wavelength of white light reflected by the tip of the functionalized sensor with the bacteriophages attached thereto and corresponding to a baseline interference pattern measurement, contacting the functionalized sensor with a capture medium comprising a liquid mixture further comprising an at least one host, irradiating the functionalized sensor with light, such that if the bacteriophages bind to the at least one host, the binding of the bacteriophages to the host shifts the baseline interference pattern measurement, and detecting and obtaining in real-time a modified interference pattern measurement, wherein the modified interference pattern measurement comprises a measurement of the at least one wavelength of white light reflected from the tip of the functionalized sensor as shifted by the bacteriophages and the at least one host attached thereto. The method may further comprise comparing the modified interference pattern measurement to the baseline interference pattern measurement to produce a sensorgram, wherein a binding signal and a lysis signal are detected, wherein the binding signal comprises an amount of the at least one host bound to the bacteriophages and the lysis signal comprises an amount of the at least one host bound to the bacteriophages while the at least one host is being lysed by the bacteriophages. The method may further include screening the phage-host range from the sensorgram.

The method may further include irradiating the tip of the sensor and detecting a control measurement, wherein the control measurement is a measurement of the at least one wavelength of white light reflected by the tip of the sensor before the obtaining of the functionalized sensor. The at least one host may further comprise a bacteria. The at least one host may further comprise a biological sample. The bacteriophages may further comprise a monolayer on the tip of the functionalized sensor.

The method may further include measuring a lysis time by determining a first local maxima of the sensorgram and by taking a first derivative of the lysis signal and determining when the first derivative is equal to zero, and wherein a latency period may be measured by determining a first local maxima of the sensorgram and by taking a first derivative of the lysis signal and determining when the first derivative is equal to zero.

The method may further include washing the functionalized sensor tip with a buffer after the bacteriophages bind to the at least one host.

The method may further include biotinylating the bacteriophages before the bacteriophages are attached to the functionalized sensor, attaching streptavidin to the sensor tip, wherein the bacteriophages attach to the functionalized sensor tip via biotin-streptavidin bioconjugation.

The method may further include comparing the modified interference pattern measurement to a second modified interference pattern measurement produced by a second host.

In another exemplary embodiment, a system for measuring phage-host dynamics and parameters using bacteriophage infection of a bacteria is provided. The system may include a sensor having a tip and a host attached and immobilized to the sensor tip to form a functionalized sensor. When the functionalized sensor is irradiated with light, an at least one wavelength of white light is reflected by the tip of the functionalized sensor with the host attached thereto, corresponding to a baseline interference pattern measurement. The system may further comprise a capture medium comprising a liquid mixture of bacteriophages provided to the functionalized sensor, the bacteriophages having a phage-host range, wherein if the host is within the phage-host range of the bacteriophages, the bacteriophages bind to the host, wherein the binding of the bacteriophages to the at least one host shifts the baseline interference pattern measurement to form a modified interference pattern measurement, wherein the modified interference pattern measurement comprises a measurement of the at least one wavelength of white light reflected from the tip of the functionalized sensor with as shifted by the host and the bacteriophages attached thereto. The system may further comprise a comparison of the modified interference pattern measurement to the baseline interference pattern measurement, the comparison comprising a sensorgram, wherein, if the host is within the phage-host range of the bacteriophages, a binding signal and a lysis signal are detected. The binding signal comprises an amount of the at least one host bound to the bacteriophages and the lysis signal comprises an amount of the at least one host bound to the bacteriophages while the at least one host is being lysed by the bacteriophages, and the phage-host range is screened.

The host may comprise a bacteria. The host may comprise a biological sample. The host may further comprise a monolayer on the tip of the functionalized sensor. The system may further comprise a control measurement, wherein the control measurement is a measurement of the at least one wavelength of white light reflected by the tip of the sensor before the obtaining of the functionalized sensor. The system may further comprise a second modified interference pattern measurement produced by a second host, wherein the second modified interference pattern is compared to the modified interference pattern.

In another exemplary embodiment, a method for label-free bacterial detection using bacteriophage infection of a bacteria is provided. The method may include providing a sensor with a tip, attaching and immobilizing to the sensor a plurality of bacteriophages having a phage-host range to obtain a functionalized sensor, irradiating the functionalized sensor with light and detecting and obtaining in real-time an at least one wavelength of white light reflected by the tip of the functionalized sensor with the bacteriophages attached thereto and corresponding to a baseline interference pattern measurement, contacting the functionalized sensor with a capture medium comprising a liquid mixture, irradiating the functionalized sensor with light, such that if the capture medium comprises an at least one host within the phage-host range of the bacteriophages, the bacteriophages bind to the at least one host, and the binding of the bacteriophages to the host shifts the baseline interference pattern measurement, detecting and obtaining in real-time a modified interference pattern measurement, wherein the modified interference pattern measurement comprises a measurement of the at least one wavelength of white light reflected from the tip of the functionalized sensor as shifted by the bacteriophages and the at least one host attached thereto, comparing the modified interference pattern measurement to the baseline interference pattern measurement to produce a sensorgram, wherein, in the presence of at least one host within the phage-host range of the bacteriophages, a binding signal and a lysis signal are detected, wherein the binding signal comprises an amount of the at least one host bound to the bacteriophages and the lysis signal comprises an amount of the at least one host bound to the bacteriophages while the at least one host is being lysed by the bacteriophages.

The at least one host may comprise a bacteria.

The method may further comprise irradiating the tip of the sensor and detecting a control measurement, wherein the control measurement is a measurement of the at least one wavelength of white light reflected by the tip of the sensor before the obtaining of the functionalized sensor.

In another exemplary embodiment, a system for label-free bacterial detection using bacteriophage infection of a bacteria is provided. The system may include a sensor having a tip and a plurality of bacteriophages having a phage-host range attached and immobilized to the sensor tip to form a functionalized sensor, such that when the functionalized sensor is irradiated with light, an at least one wavelength of white light is reflected by the tip of the functionalized sensor with the bacteriophages attached thereto, corresponding to a baseline interference pattern measurement. The system further comprises a capture medium comprising a liquid mixture provided to the functionalized sensor, wherein if the capture medium comprises an at least one host within the phage-host range of the bacteriophages, the bacteriophages bind to the at least one host. The binding of the bacteriophages to the at least one host shifts the baseline interference pattern measurement to form a modified interference pattern measurement, wherein the modified interference pattern measurement comprises a measurement of the at least one wavelength of white light reflected from the tip of the functionalized sensor with as shifted by the bacteriophages and the at least one host attached thereto. The system further comprises a comparison of the modified interference pattern measurement to the baseline interference pattern measurement, the comparison comprising a sensorgram. In the presence of at least one host within the phage-host range of the bacteriophages, a binding signal and a lysis signal are detected, wherein the binding signal comprises an amount of the at least one host bound to the bacteriophages and the lysis signal comprises an amount of the at least one host bound to the bacteriophages while the at least one host are is being lysed by the bacteriophages, and the bacteriophage-host range is screened. After the bacteriophages bind to the at least one host, the sensor tip may be washed with a buffer. The bacteriophages may be biotinylated before being attached to the sensor, and streptavidin may be attached to the sensor tip, and the bacteriophages may attach to the sensor tip via biotin-streptavidin bioconjugation. The system may further comprise a control measurement, wherein the control measurement is a measurement of the at least one wavelength of white light reflected by the tip of the sensor before the obtaining of the functionalized sensor.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
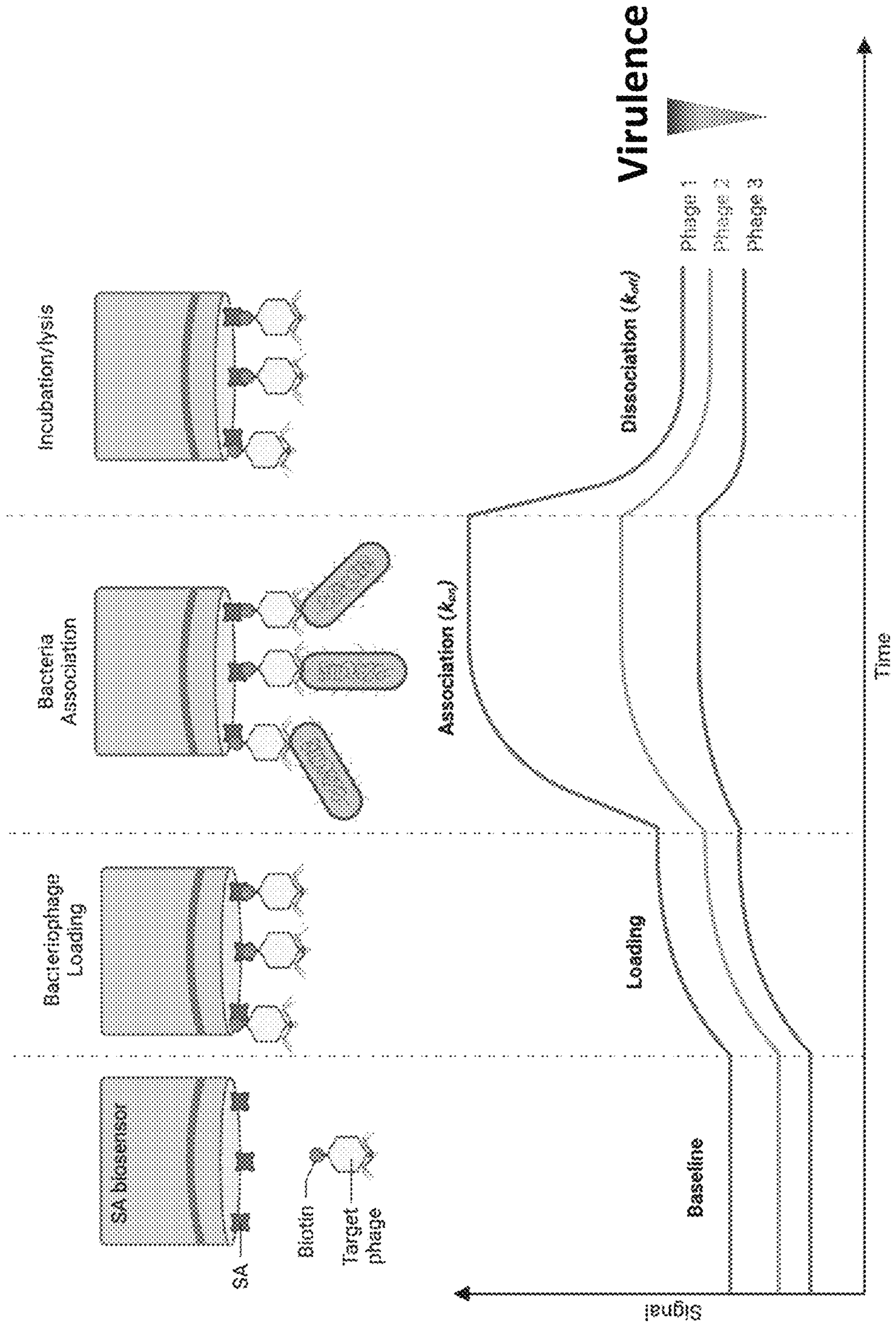
FIG. 1 illustrates an overview of the disclosed system and method that can quantify phage virulence and measure phage-host range and phage-host dynamics and parameters in complex media and in a high-throughput manner, and an exemplary real-time signal readout for bacterial binding and lysis, in accordance with the general inventive concepts.

The general inventive concepts will be understood more fully from the detailed description given below and from the accompanying drawings of the various aspects and implementations of the disclosure. This should not be taken to limit the general inventive concepts to the specific aspects or implementations, which are being provided for explanation and understanding only.

As previously described, to help address the global health threat of antibiotic resistance, phage therapy needs to be able to quantify phage virulence, measure phage-host range and phage-host dynamics and parameters, specifically phage infectivity parameters such as binding kinetics and lysis time. Phage therapy also and needs to be capable of being carried out in complex media and in a high-throughput manner. Towards this end, the present disclosure demonstrates and validates the use of assays that can quantify phage virulence, measure phage-host range, and measure phage-host dynamics and parameters in complex media and in a high-throughput manner. Furthermore, the present invention can be used to detect bacterial contamination of complex media, such as media that is opaque and difficult to analyze through traditional spectroscopic methods.

Storms et al. and Konopacki et al. developed a method to quantify a phage of interest's virulence, referred to as "virulence index" or "phage score," by measuring bacterial killing dynamics at varying multiplicity of infection ("MOIs"), where MOI is the ratio of phage to bacteria. However, this approach/these approaches uses optical density as a readout for bacterial viability, in which bacterial cellular debris from lysis may obscure results and underestimate phage lytic activity.

The OmniLog™ system disclosed by Henry et al., which uses redox chemistry to monitor bacterial metabolic activity by including a tetrazolium dye at 1% (v/v) in the growth medium, somewhat addresses these limitations. During bacterial growth, respiration reduces the tetrazolium dye and produces a color change, thus phage-mediated lysis results in a decreased color change compared to bacteria grown in the absence of phage. The OmniLog™ system is high-throughput with the capacity to monitor 50 microtiter plates at a time, and can carry out 4,800 phage assays simultaneously. In this method, bacterial debris does not interfere with the signal readout.

Though the methods used by Storms et al. and Konopacki et al., as well as by Henry et al., are high throughput, they use a turn-off signal to assess phage virulence and phage-host range, which limits sensitivity.

Edigo et al. developed a fluorescent turn-on assay by adding Sytox green fluorescent dye, a membrane-impermeable nucleic acid dye that fluoresces when bound to DNA, to the growth medium. Phage-mediated lysis results in the release of bacterial DNA and an increase in fluorescent signal. However, the phage DNA also produces a positive signal, resulting in high background and reduced sensitivity, and also confounds results.

Each of these approaches requires phage plaquing to determine MOI for virulence quantification, which is laborious and can produce inconsistent findings. Most importantly, these methods cannot be carried out in complex media, such as colored or high-viscosity solutions or inhomogeneous mixtures, which are often conditions encountered in vivo, and cannot measure phage-host dynamics and parameters, specifically phage infectivity parameters such as binding kinetics and lysis time in the same assay.

The present invention addresses these unmet needs for a method to quantify phage virulence, and detect and study phage-host range, dynamics, and parameters, that is amenable to automation, high-throughput, and functional in complex media. It is difficult to measure binding parameters for bacteriophages that have fast lysis times, whereas the present invention is a real-time measurement that can do so. Furthermore, the present invention herein can be used to detect bacterial contamination of complex media and biological samples, such as media that is opaque and difficult to analyze through traditional spectroscopic methods, for example, baby formula.

Unless defined otherwise, all technical and scientific terms used herein have the same meaning as commonly understood by one of ordinary skill in the art to which the invention belongs.

"Biosensor" ("sensor") as used herein refers to a sensor comprising a sensing element that senses a molecular event and a transducer that converts the molecular event into a quantifiable signal such as by interferometry.

Biolayer interferometry ("BLI") as used herein includes the method and system for measuring the interference pattern of white light reflected from a layer of biomolecules immobilized on the surface of a biosensor tip or surface in real time and in solution. As the number of biomolecules bound to the sensor tip increases, there is a red shift in reflected light. This is converted to a "binding signal" and plotted as a function of time, producing a sensorgram from which kinetic parameters including those describing lysis can be derived.

"Bacteriophage," also known as a "phage," as used herein refers to a virus that infects and replicates within bacteria and archaea.

"Host" as used herein refers to a bacteria or archaea that a phage attaches to, injects genomic material into, and to which a phage undergoes a lytic cycle. "Host" as used herein can also refer to a biological sample, for instance, a mammal or human sample. In certain embodiments, "host" includes immune system components.

"Phage-host range" as used herein refers to a plurality of host species or host or sub species that a particular lytic phage can bind to and replicate within. In other words, a range of hosts that a particular lytic phage can bind to and replicate within.

"Lysis" as used herein refers to the breaking down of the host's cell membrane during the lytic cycle of a phage.

"Binding" or "bacterial association" as used herein refer to the binding of a phage to a host.

"Label-free" and "without labeling" as used herein includes quantification methods without the use of fluorescent probes or particle labels.

"Phage modification" as used herein refers to any method to modify a phage with a linker moiety. A "modified phage" as used herein refers to a phage that has been modified with a linker moiety.

"Sensor functionalization" or "loading" as used herein refers to any method to immobilize a phage, for example using a bi- or heterobifunctional linker, or a host, to the sensor surface.

A "functionalized sensor" or "loaded sensor" as used herein refers to a sensor having a modified phage ("phage-functionalized sensor" or "phage-loaded sensor") or a host ("host-functionalized sensor" or "host-loaded sensor") immobilized to its surface.

Referring now to the drawings, which are for purposes of illustrating exemplary embodiments of the subject matter herein only, and not for limiting the same, FIG. 1 shows an interferometry system (e.g., label-free interferometry system 100) for quantifying phage virulence, measuring phage-host range, and measuring phage-host dynamics and parameters in complex media and in a high-throughput manner.

In some embodiments, as illustrated in FIG. 1, the system may include at least sensor 1. As can be seen in the "loading" phase of FIG. 1, sensor 1 has a tip 2, with a plurality of bacteriophages 3 immobilized on tip 2, that when irradiated with light, reflects at least one wavelength of white light corresponding to a baseline interference measurement 4. System 100 transduces the light reflected by tip 2 and any molecules attached thereto to a real-time signal comprising sensorgram 5. As a capture medium 6 comprising an aqueous solution comprising at least one host 7 is applied to tip 2 of sensor 1, the bacteriophages 3 bind to the at least one host 7 as can be seen in the "association" phase of FIG. 1. Furthermore, as sensor 1 is irradiated with light, the binding of the bacteriophages 3 to the host 7 shifts the baseline interference pattern measurement 4 to a modified interference pattern measurement, wherein the modified interference pattern measurement 8 comprises a measurement of the at least one wavelength of white light reflected from tip 2 of sensor 1 with the bacteriophages 3 and at least one host 7 attached thereto.

Sensorgram 5 comprises a binding signal 9 and a lysis signal 10 plotted as a function of time, wherein binding signal 9 comprises an amount of host bound to the bacteriophages and lysis signal 10 comprises an amount of host bound to the bacteriophages during lysis.

In some embodiments, the at least one host comprises bacteria and the bacteriophage comprises a monolayer 11 on the tip of the sensor 1.

Figure 2:
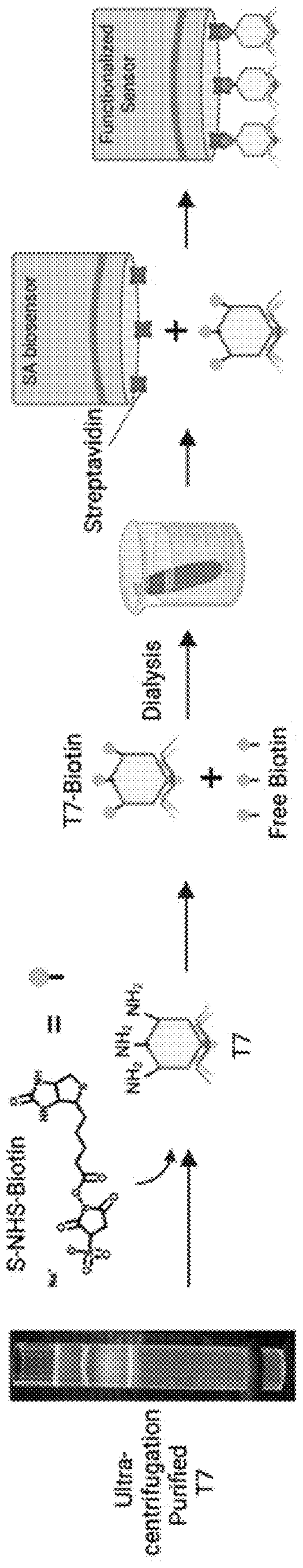
FIG. 2 is a schematic depicting the steps to synthesize an exemplary phage-functionalized sensor, in accordance with the general inventive concepts.

As illustrated in FIG. 2, in some embodiments, the bacteriophages 3 may be modified with a biotin 12. In some embodiments, the bacteriophages 3 may be modified with a sulfo-NHS-biotin heterobifunctional linker, NHS-maleimide linker, click chemistry, and/or by cross coupling. In some embodiments, the bacteriophages 3 may display an affinity tag by genetic engineering.

In some embodiments, sensor 1 may have streptavidin attached to tip 2 and the bacteriophages 3 may be attached to sensor 1 using biotin-streptavidin bioconjugation, as shown in FIG. 2.

Kinetic parameters can be derived from sensorgram 5. Based on binding signal 9 and lysis signal 10, lysis time may be determined. Lysis time is determined by taking the first derivative of lysis signal 10 and finding the time when the rate of change, $d_{binding}/d_t$, equals zero, or by determining a first local maxima of sensorgram 5.

Based on binding signal 9 and lysis signal 10, a latency period may be calculated. Since single infection cycles are observed by system 100, the latency period, the time taken by a phage particle to reproduce inside an infected bacteria cell, can be determined by taking the first derivative of lysis signal 10 and finding the time point when the rate of change, $d_{binding}/d_t$, is equal to zero or by determining a first local maxima of sensorgram 5.

The following examples illustrate features and/or advantages of the systems and methods according to the general inventive concepts. The examples are given solely for the purpose of illustration and are not to be construed as limitations of the general inventive concepts, as many variations thereof are possible without departing from the spirit and scope of the general inventive concepts.

EXAMPLES

Sensor Functionalization and Characterization

FIG. 2 shows a schematic depicting the steps to synthesize an exemplary functionalized sensor to be used with the inventive concepts described herein. The bacteriophage T7 (phage T7) was selected because it has high therapeutic potential, is active in vivo, can be engineered to expand phage-host range to target an array of pathogens, and can be used as a phagemid delivery system. As depicted in FIG. 2, T7 is modified with biotin-NHS and then loaded onto a biosensor with streptavidin attached to the sensor surface ("SA biosensor" or "SA sensor"), using biotin-streptavidin bioconjugation. The T7 phage was biotinylated using a sulfo-NHS-biotin heterobifunctional linker and then immobilized onto an SA biosensor.

Figure 3:
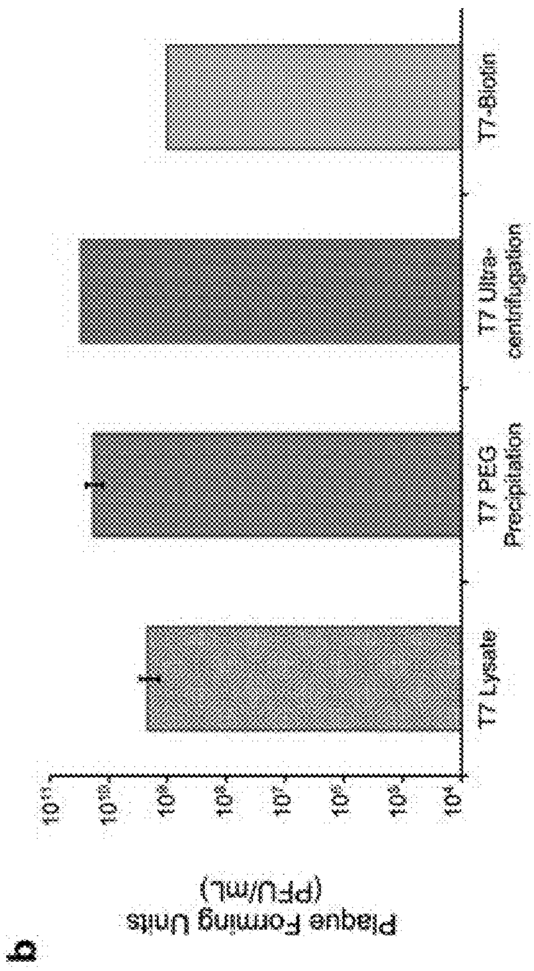
FIG. 3 shows the average T7 activity measured throughout the functionalization process, measured after polyethylene glycol ("PEG") precipitation, cesium chloride density gradient ultra-centrifugation, and biotin-NHS labeling and dialysis in phosphate buffered saline ("PBS"), as determined by plaquing assays shown as the mean of three replicates, in accordance with the general inventive concepts.
Figure 4:
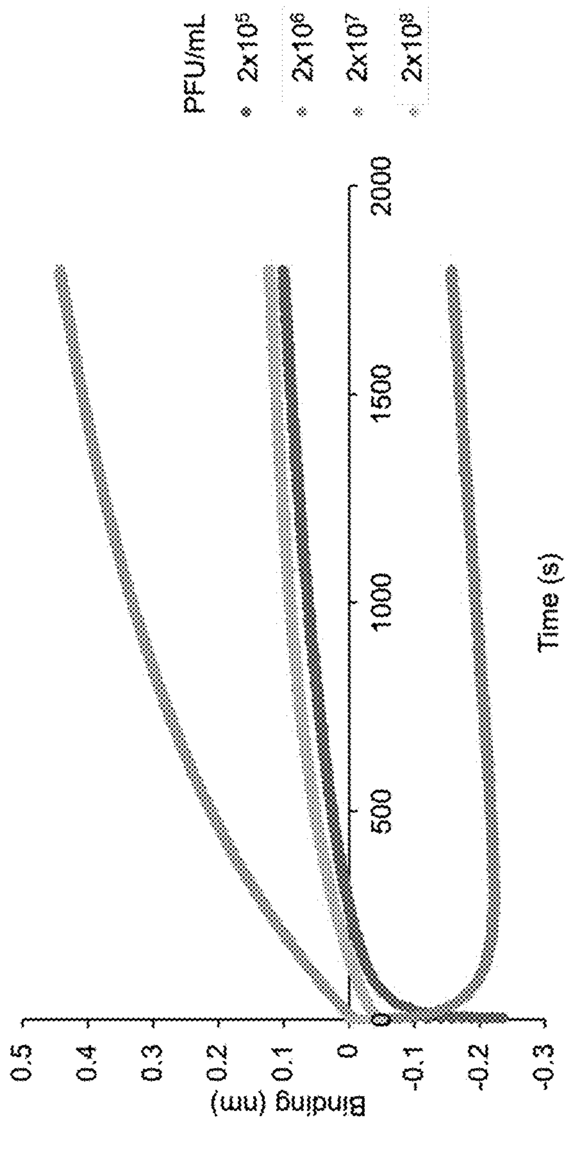
FIG. 4 depicts the signal responses produced when streptavidin sensors were functionalized with varying concentrations of the biotinylated-phage ("T7-bio") to determine the optimal loading concentration of T7-bio, in accordance with the general inventive concepts.

As amine-reactive molecules can quench the NHS reaction and are present in crude phage lysates, T7 lysates were first PEG precipitated, purified via ultracentrifugation to separate larger phage particles from smaller biomolecules having amines, and dialyzed prior to NHS conjugation. Specifically, T7 lysates were grown in eight 100 mL cultures using BW25113 as the production strain. The resulting lysates were concentrated 10 times via PEG precipitation and purified by cesium chloride (CsCl) density gradient ultracentrifugation to remove smaller amine reactive molecules. CsCl was then buffer exchanged with PBS for the sulfo-NHS reaction. Following biotin-NHS labeling, the biotinylated-phage, T7-bio, was dialyzed in PBS to remove excess biotin. After each step (PEG precipitation, CsCl density gradient ultra-centrifugation, and biotin-NHS labeling and dialysis in PBS), phage activity was assessed via plaquing to quantify the remaining number of infective particles. Importantly, centrifugal forces, biotinylation, and dialysis did not result in significant loss in the number of infective particles. FIG. 3 shows the average T7 activity throughout the sensor functionalization (or loading) process, measured after PEG precipitation, CsCl density gradient ultra-centrifugation, and biotin-NHS labeling and dialysis in PBS, as determined by plaquing assays shown as the mean of three replicates, with error bars representing the standard deviation.

The SA biosensors were incubated in varying concentrations of T7-bio. To determine the optimal phage concentration for sensor functionalization, 10× serial dilutions of T7-bio were tested, ranging from $2\times10^5$ to $2\times10^8$ PFU/mL in 200 μL.

Figure 5:
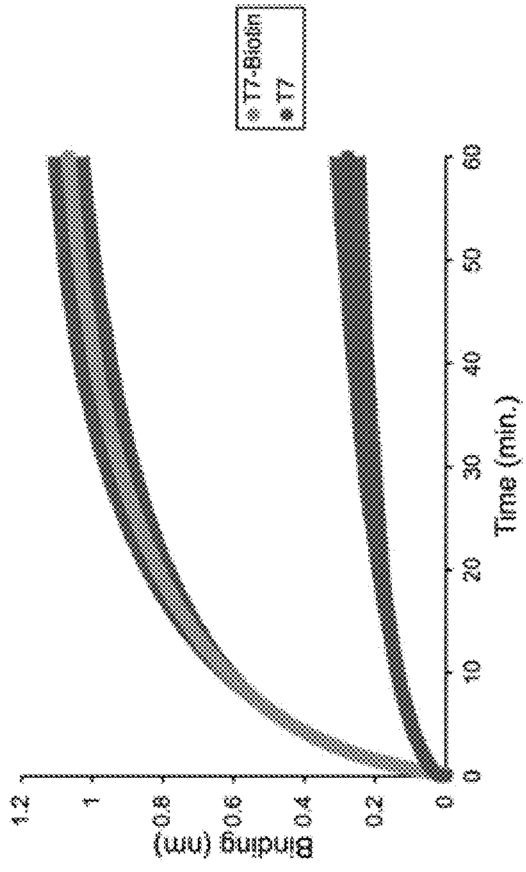
FIG. 5 shows overlayed sensorgrams comparing the specific binding of T7-bio and the nonspecific binding of wild-type T7 (non-biotinylated) to the streptavidin sensors, in accordance with the general inventive concepts.

FIG. 5 shows overlayed sensorgrams comparing the specific binding of T7-bio SA biosensor to the nonspecific binding of wild-type T7 (non-biotinylated) SA biosensor. Wild-type T7 (non-biotinylated) ($2\times10^{10}$ PFU/mL) was used as a control to differentiate non-specific binding. Importantly, wild-type T7, a thousand times more concentrated compared to T7-bio, produced a significantly lower binding signal, thus showing selective T7-bio sensor loading.

Figure 6:
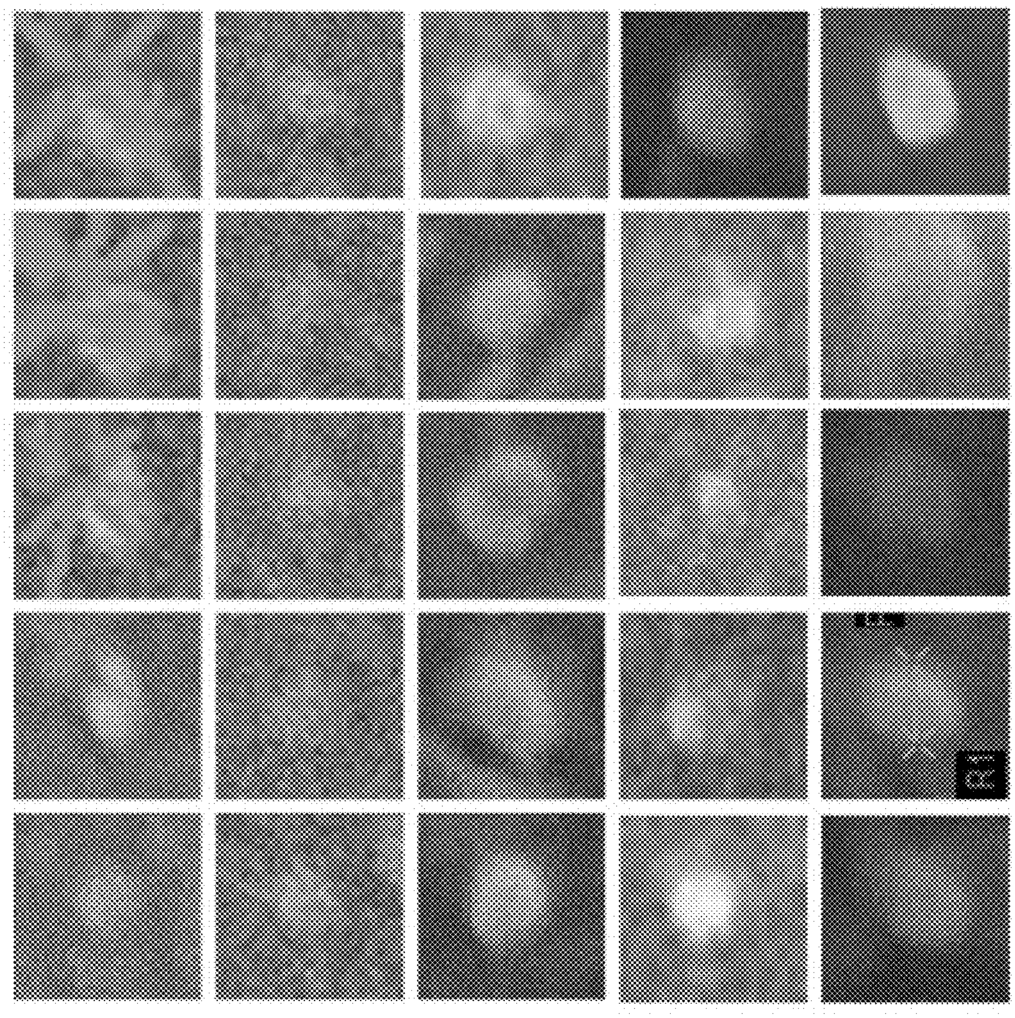
FIG. 6 depicts SEM images of the twenty-five phage particles used for characterizing T7-bio dimensions, in accordance with the general inventive concepts.

Next scanning electron microscopy (SEM) was performed on the sensor surface to confirm T7 immobilization. FIG. 6 shows SEM images of the twenty-five phage particles used for characterizing T7-bio dimensions. The SEM analysis of the immobilized T7 particles depicted an average length and diameter of 85±15 nm and 66±11 nm respectively. This corresponds to the dimensions calculated from a 3D cryo-electron tomography derived model from Hu et al., showing dimensions of ~84×53 nm.

Figure 7:
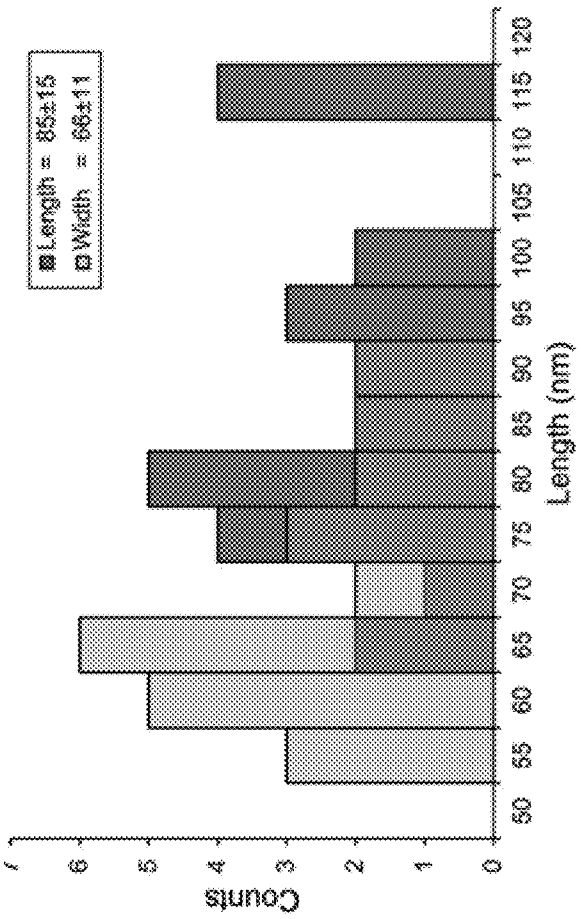
FIG. 7 depicts a histogram of the twenty-five phage particle diameters (along both the short and long axes) immobilized to the SA sensor obtained from SEM analysis, in accordance with the general inventive concepts.

FIG. 7 shows a histogram of the twenty-five phage particle diameters (along both the short and long axes) immobilized to the SA biosensor obtained from SEM analysis.

Figure 8:
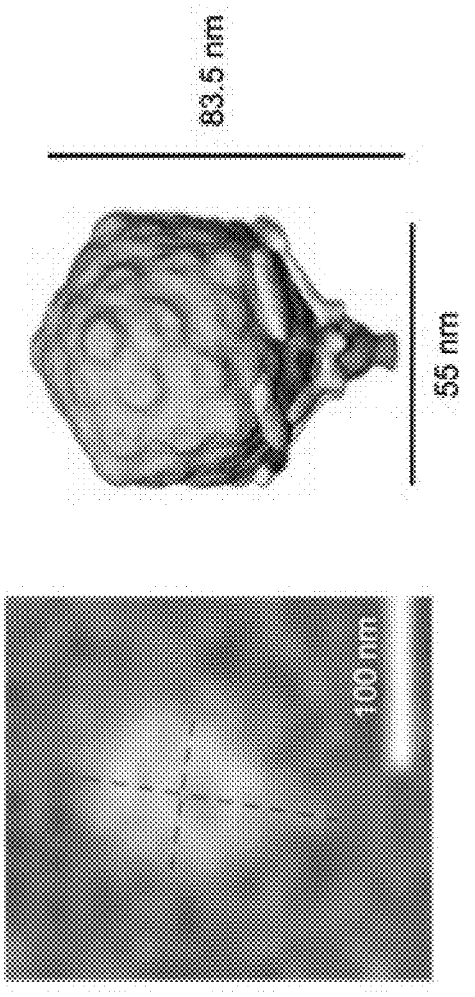
FIG. 8 shows a representative SEM image of T7-bio loaded onto the SA sensor surface, in accordance with the general inventive concepts, and a 3D model of T7 rendered from cryo-electron tomography (cryo-ET)

FIG. 8 depicts a representative SEM image of T7-bio immobilized onto the SA sensor surface, compared to a 3D model of T7 rendered from cryo-electron tomography (cryo-ET).

Figure 9:
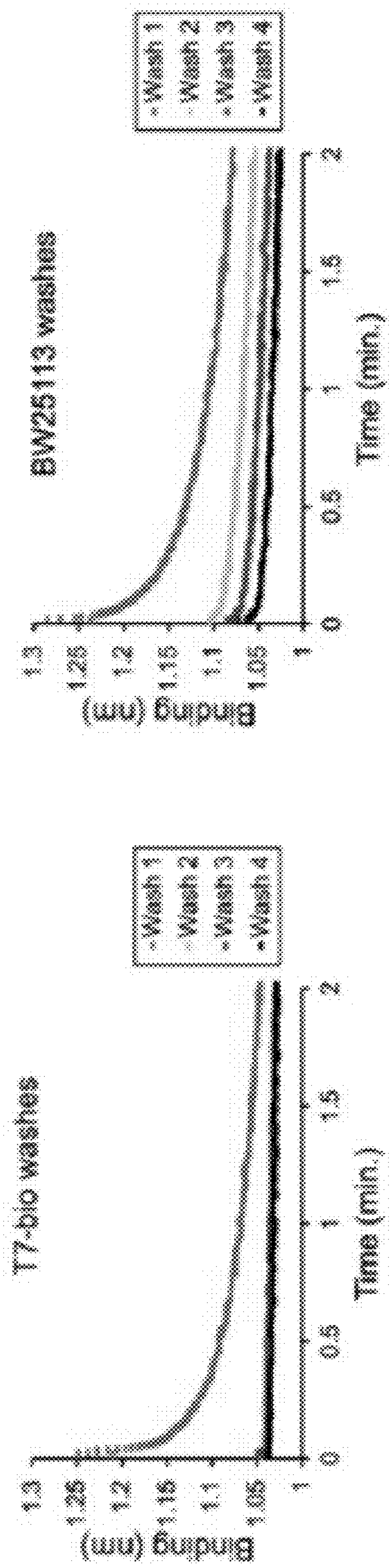
FIG. 9 depicts overlayed sensorgrams showing the washing steps in PBS tween-20 buffer ("PBS-T") after sensor loading with T7-bio, and overlayed sensorgrams showing the wash steps in PBS-T after bacterial association, in accordance with the general inventive concepts.

The fiber optic element has surface area that is not part of the sensor surface where phage and bacteria can also nonspecifically bind, therefore the sensor was washed to remove any nonspecific bound T7 and bacteria. PBS-T was the best buffer for removing nonspecifically bound T7 and BW25113. All buffers were efficient at removing nonspecifically bound phage, and PBS-T washed away nonspecifically bound bacteria to below detectable levels (<$10^3$ CFU/mL). The wash steps were optimized by testing various wash solutions and varying the number of washes. The solutions investigated were PBS, PBS tween-20 (PBS-T, 0.1% v/v), and LB. These solutions were examined by monitoring the loss in signal over time and measuring the plaquing of each wash solution to quantify the number of nonspecifically bound phages. The wash protocol was also investigated for removing nonspecifically bound BW25113 from the sensors following bacterial association by similarly monitoring the loss in signal and enumerating the number of nonspecifically bound bacteria in the wash buffers. FIG. 9 depicts overlayed sensorgrams showing the washing steps in PBS tween-20 buffer ("PBS-T") after sensor loading with T7-bio and overlayed sensorgrams showing the wash steps in PBS-T after bacterial association.

Figure 10:
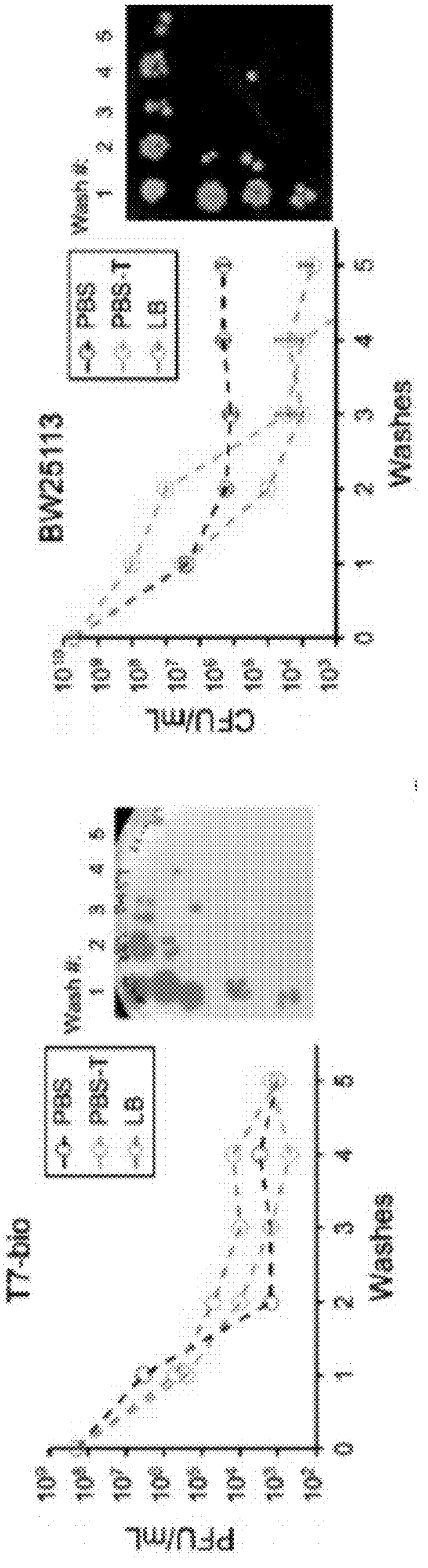
FIG. 10 shows the amount of phage (T7-bio) and bacteria (BW25113) washed from the SA biosensor after each 400 μL wash step in varying buffers and the corresponding plaque or bacterial enumeration assay, used to quantify washing efficacy in accordance with the general inventive concepts.

FIG. 10 shows the amount of phage (T7-bio) and bacteria (BW25113) washed from the SA biosensor after each 400 μL wash step in varying buffers. Points represent the mean of 3 replicates with error bars representing the standard deviation. FIG. 10 also shows the corresponding plaque or bacterial enumeration assay used to quantify washing efficacy.

Detecting Bacterial Binding and Lysis

Phage-host dynamics were studied by submerging T7-sensors in bacterial broth cultures and measuring signal over time. Both BW25113, a known phage-sensitive strain, and BW25113ΔwaaCΔtrxA, an engineered T7 resistant strain, were tested. BW25113ΔwaaCΔtrxA has two mutations that make it T7 resistant by blocking T7 binding and inhibiting T7 replication, respectively. Specifically, waaC is part of the waa gene cluster and encodes for an enzyme involved in LPS core biosynthesis. The ΔwaaC gene deletion results in a truncated LPS lacking nearly all of the outer core, including the glucose moiety that T7 uses as a receptor. trxA encodes for thioredoxin 1, a processivity factor for T7 RNA polymerase and a known essential host gene for T7 replication.

Figure 11:
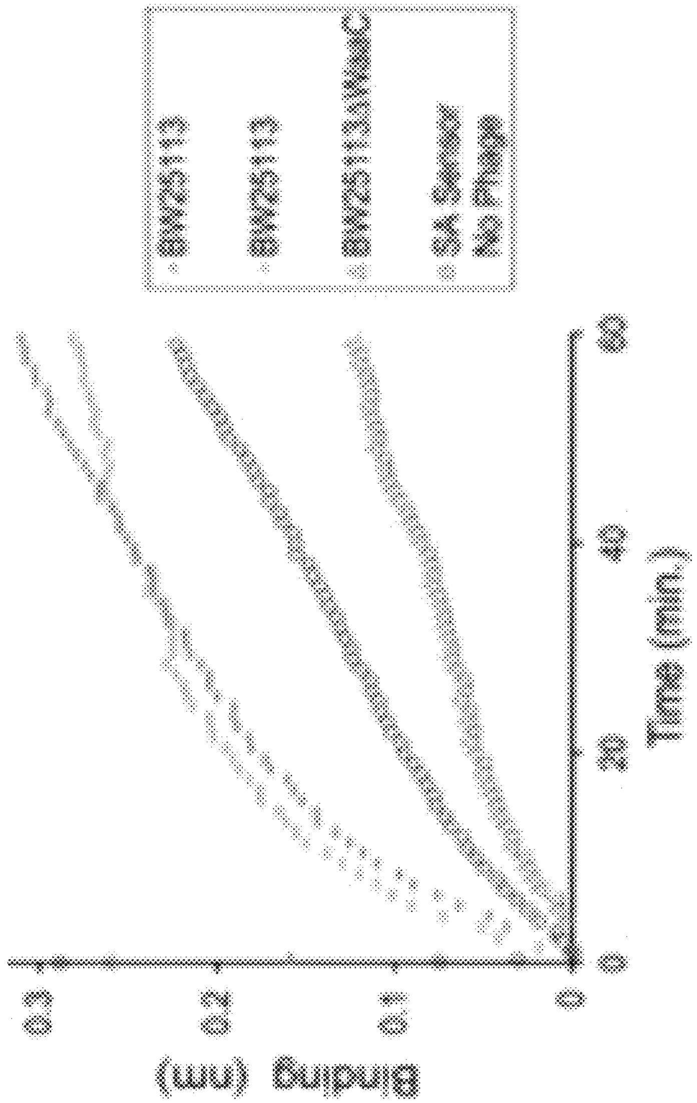
FIG. 11 depicts overlaid sensorgrams showing the dynamics of BW25113, a known phage-sensitive strain, and BW25113ΔwaaCΔtrxA, an engineered T7 resistant strain to compare bacterial association, in accordance with the general inventive concepts.

FIG. 11 depicts overlaid sensorgrams showing the dynamics of these two strains to compare bacterial association. Overlaid sensorgrams show bacterial binding for BW25113 and T7 resistant mutant (BW25113ΔwaaCΔtrxA) to the T7-bio functionalized sensor. Two independent replicate trials are shown for BW25113 and one for BW25113 ΔwaaC ΔtrxA. The bacterial binding was determined to be specific to the T7 sensor by comparing these sensorgrams to one of the SA sensor with no phage with BW25113 ("SA Sensor No Phage"). BW25113 had stronger association to the T7 sensor compared to BW25113ΔwaaCΔtrxA, as indicated by a larger slope and higher binding signal, after 60 minutes. Two independent trials of BW25113 dynamics were tested to evaluate reproducibility, which showed an average standard deviation of ±0.088 nm between the two, and T7 has a much stronger association and faster binding kinetics to BW25113 compared to BW25113ΔwaaCΔtrxA, indicating that the present invention can compare phage binding parameters when investigating phage host-range.

Figure 12:
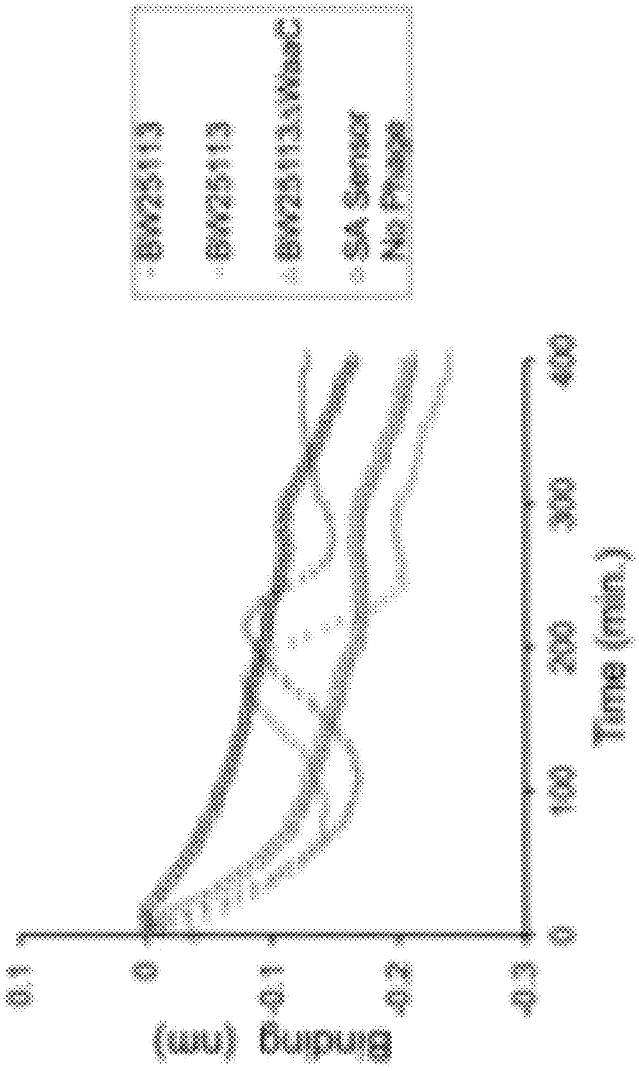
FIG. 12 depicts overlaid sensorgrams showing the dynamics of BW25113 and BW25113ΔwaaCΔtrxA to compare lysis (or lack thereof), in accordance with the general inventive concepts.

FIG. 12 depicts overlaid sensorgrams showing the dynamics of these two strains to compare lysis (or lack thereof), which was measured after bacterial association and after sensors were washed. Overlaid sensorgrams show bacterial lysis for BW2511 and no lysis for BW25113ΔwaaCΔtrxA. A sensorgram for the SA sensor with no phage is also overlaid and shows bacterial growth after about 250 minutes.

Interestingly, after approximately 120 minutes, a sharp increase in signal was observed for both BW25113 and BW25113ΔwaaCΔtrxA. Applicant originally hypothesized that this was due to bacterial replication. However, both ΔwaaC and ΔtrxA mutations incur a severe fitness cost to BW25113, as seen in bacterial growth kinetics (see FIG. 15), meaning the nearly identical rate of signal increase would be inconsistent with the bacterial growth kinetics.

Applicant then speculated that this signal increase was due to the bacteria changing morphology, for example due to bacterial swelling induced by phage infection. This is corroborated by recent reports of single-molecule fluorescence studies monitoring T7-bacterial dynamics, where an increase in surface roughness and 200-500 nm bleb formation were observed in early T7 infection.

Following this phase, only BW25113 showed a rapid decrease in signal, indicative of sudden lysis and diffusion of bacterial debris away from the sensor surface. As expected, BW25113ΔwaaCΔtrxA did not produce a lysis signal, which is consistent with reports that ΔtrxA severely inhibits T7 propagation.

Since single infection cycles are observed, the latency period, the time taken by a phage particle to reproduce inside an infected host cell, can easily be determined by taking the first derivative of the sensorgram and finding the time point when the rate of change, $d_{binding}/d_t$, is equal to zero or determining the first local maxima of the sensorgram. Our results show that T7 has a latency time of ~235±14 minutes at room temperature. The slight difference between runs can be attributed to the small temperature variations between experiments, which were run on different days at room temperature. Traditionally, latency period is measured by single-growth kinetics, where bacteria are infected with phage at a high MOI (>1), and bacterial growth is observed. Unlike the inventive concepts herein, this requires plaquing to determine MOI, which is labor-intensive. Additionally, the traditional approach is sensitive to experimental parameters such as bacterial growth phase.

Figure 13:
FIG. 13 depicts SEM images of the sensor surface, confirming bacterial binding and lysis, in accordance with the general inventive concepts.

FIG. 13 depicts SEM images of the sensor surface, confirming bacterial binding and lysis. To confirm bacterial lysis, SEM was used to visualize bacterial debris on the sensor surface. T7 sensors were incubated with BW25113 for bacterial association and then washed and incubated in LB until lysis signal was observed. After ~12 hours, sensors were removed from LB and submerged in paraformaldehyde fixative to preserve the biological structure. Representative images showing bacterial lysis and lysed product are shown in FIG. 13. Importantly, lysis debris is overlaid with immobilized T7-biosensors (white colored particles), thus confirming phage sensor-induced lysis.

Figure 14:
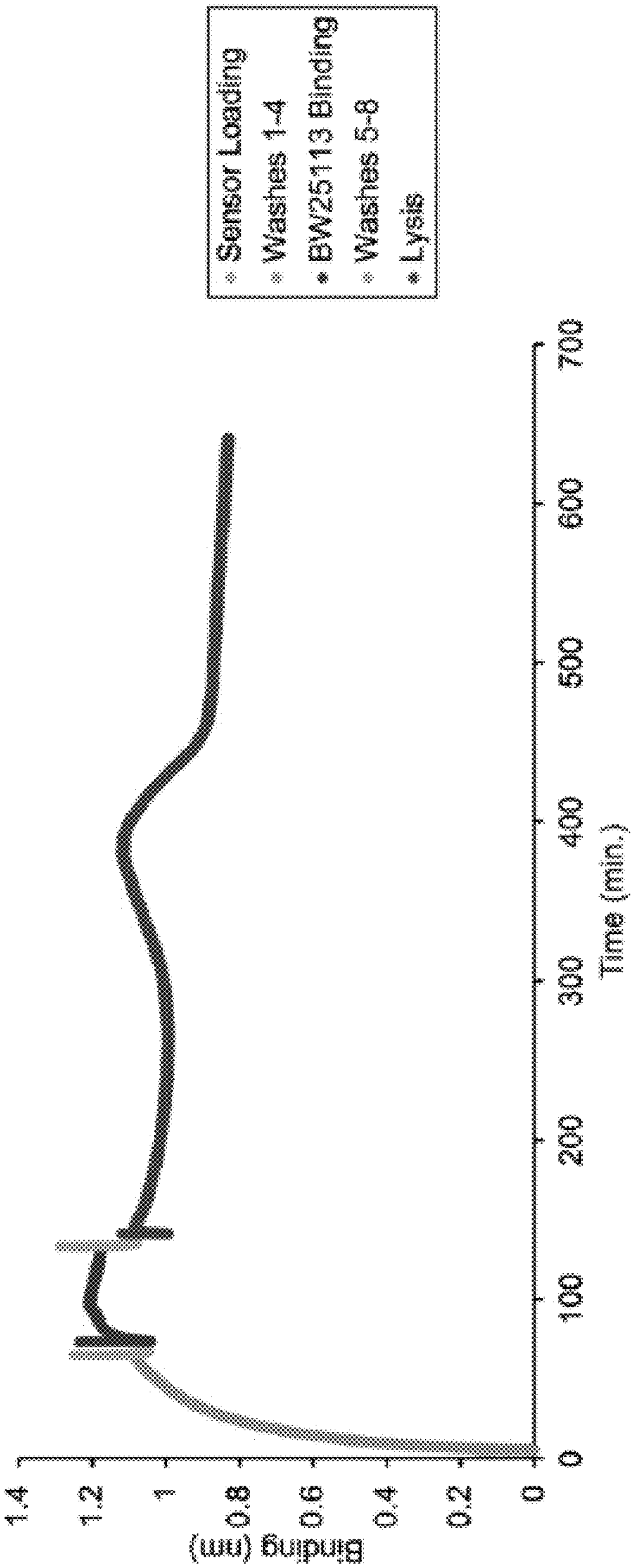
FIG. 14 depicts a sensorgram of the combined process: the sensor loading or functionalization stage (the addition of T7-bio to the sensor surface), a wash stage conducted after phage and bacterial association, the bacterial binding stage (the binding of BW25113 to T7-bio on the surface of the biosensor after the first wash stage), and the lysis stage (the interactions of T7-bio and BW25113 in lysogeny broth ("LB") media), in accordance with the general inventive concepts.

FIG. 14 depicts a sensorgram of the combined process: the sensor loading stage (the addition of T7-bio to the sensor surface), a wash stage conducted after phage and bacterial association, the bacterial binding stage (the binding of BW25113 to T7-bio on the surface of the biosensor after the first wash stage), and the lysis stage (the interactions of T7-bio and BW25113 in LB media).

Figure 15:
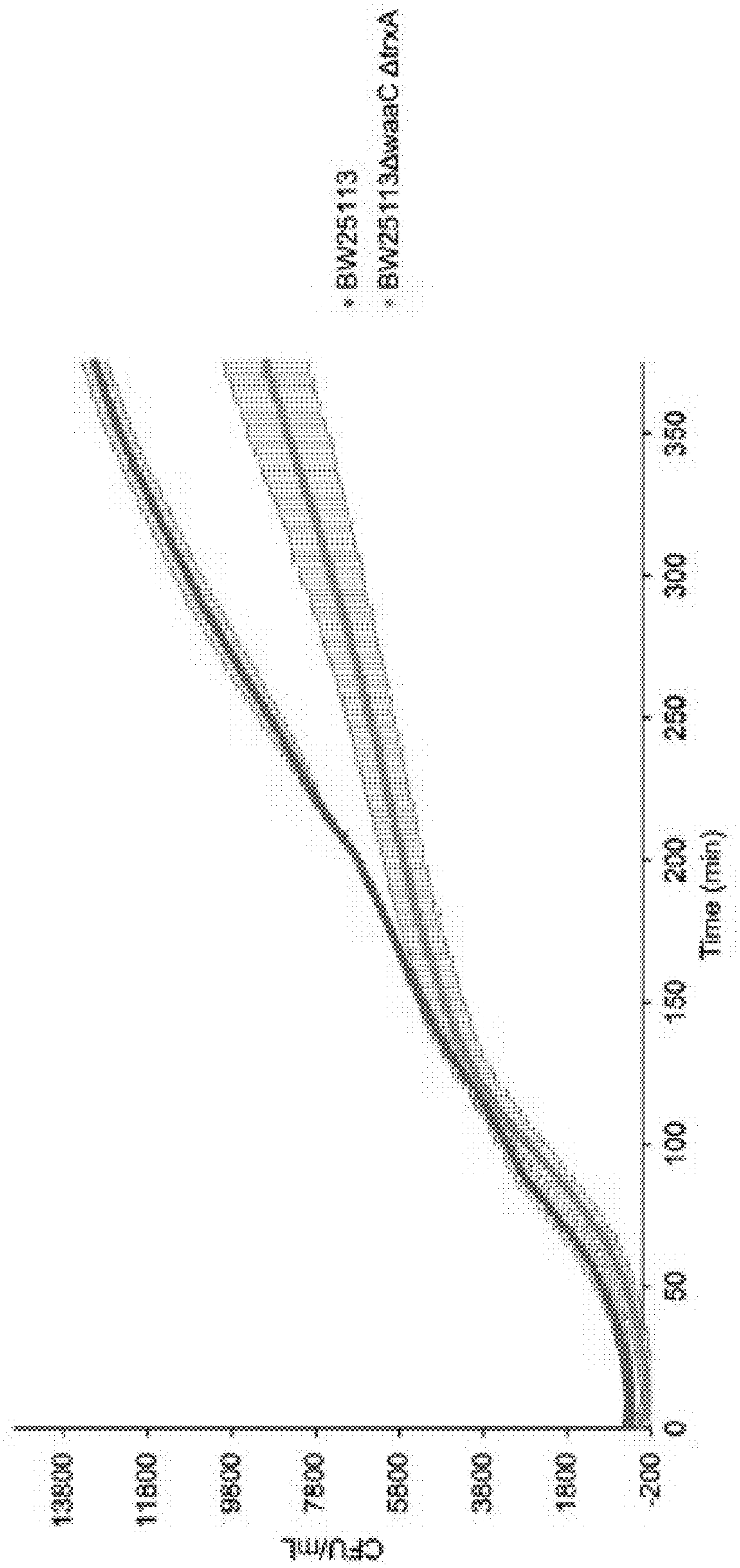
FIG. 15 depicts standardized bacterial growth curves for BW25113 and BW25113 ΔwaaCΔtrxA, in accordance with the general inventive concepts.

FIG. 15 depicts standardized bacterial growth curves for BW25113 and BW25113 ΔwaaCΔtrxA. The BW25113 and BW25113 ΔwaaCΔtrxA curves were converted to CFU/mL from OD600 by using a calibration curve shown in FIG. 16.

Figure 16:
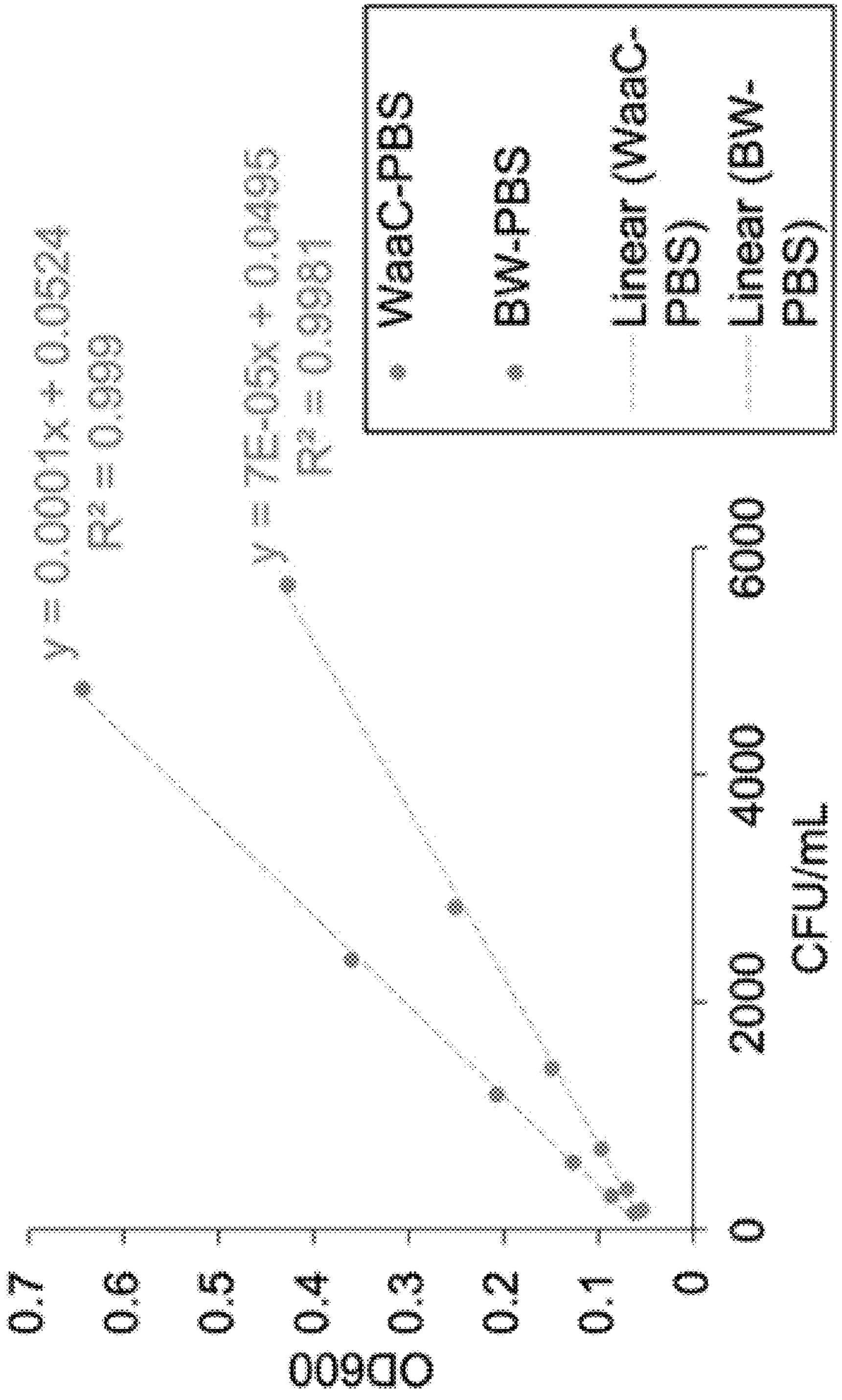
FIG. 16 depicts a calibration curve converting OD600 to colony forming units ("CFU")/mL for BW25113 and BW25113ΔwaaCΔtrxA, in accordance with the general inventive concepts.

FIG. 16 shows a calibration curve converting OD600 to CFU/mL for BW25113 (Rr 2=0.999) and BW25113ΔwaaCΔtrxA (R 2=0.9981). The BW25113 and BW25113 ΔwaaC ΔtrxA curves depicted in FIG. 15 provided the conversion factors for OD600 to CFU/mL. This also helped to accurately illustrate the differences in growth rate between these two strains.

Screening Phage Host-Range to Identify Sensitive and Insensitive Bacteria Strains To demonstrate the screening of phage-host range to identify phage sensitive and insensitive strains, the T7 host-range was screened using part of the ECOR collection. The ECOR collection comprises *E. coli* strains from geographical locations all around the world, isolated from a variety of hosts including animals and humans. Traditional phage screening methods DLA and kinetic growth assays were carried out as comparisons and are summarized in FIGS. 17A through 17C and FIGS. 18A through 18C.

Figure 17A:
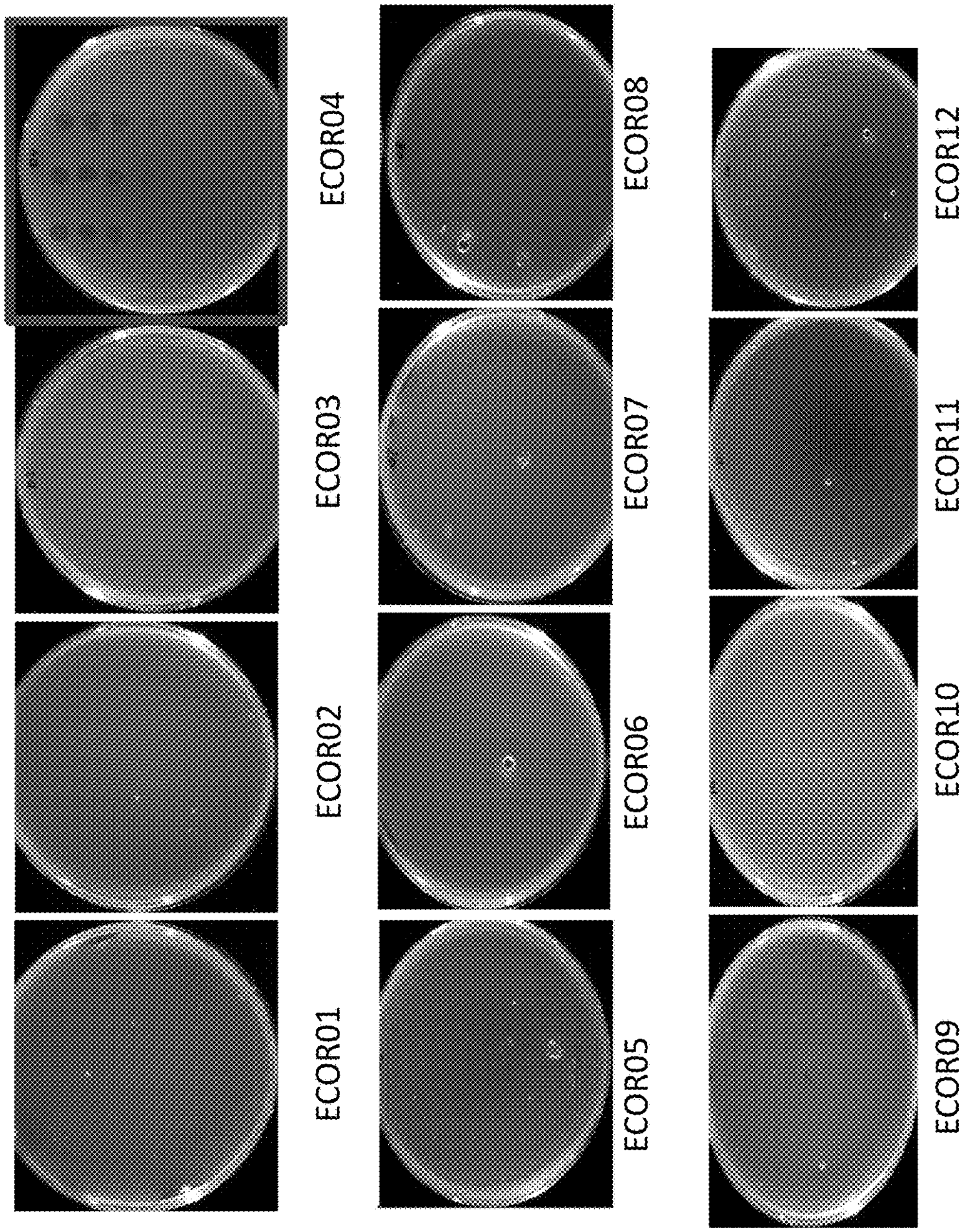
FIG. 17A shows the results of DLA assays run on strains 1 through 12 strains of the ECOR collection to compare with the screening done with part of the ECOR collection in accordance with the general inventive concepts.
Figure 17B:
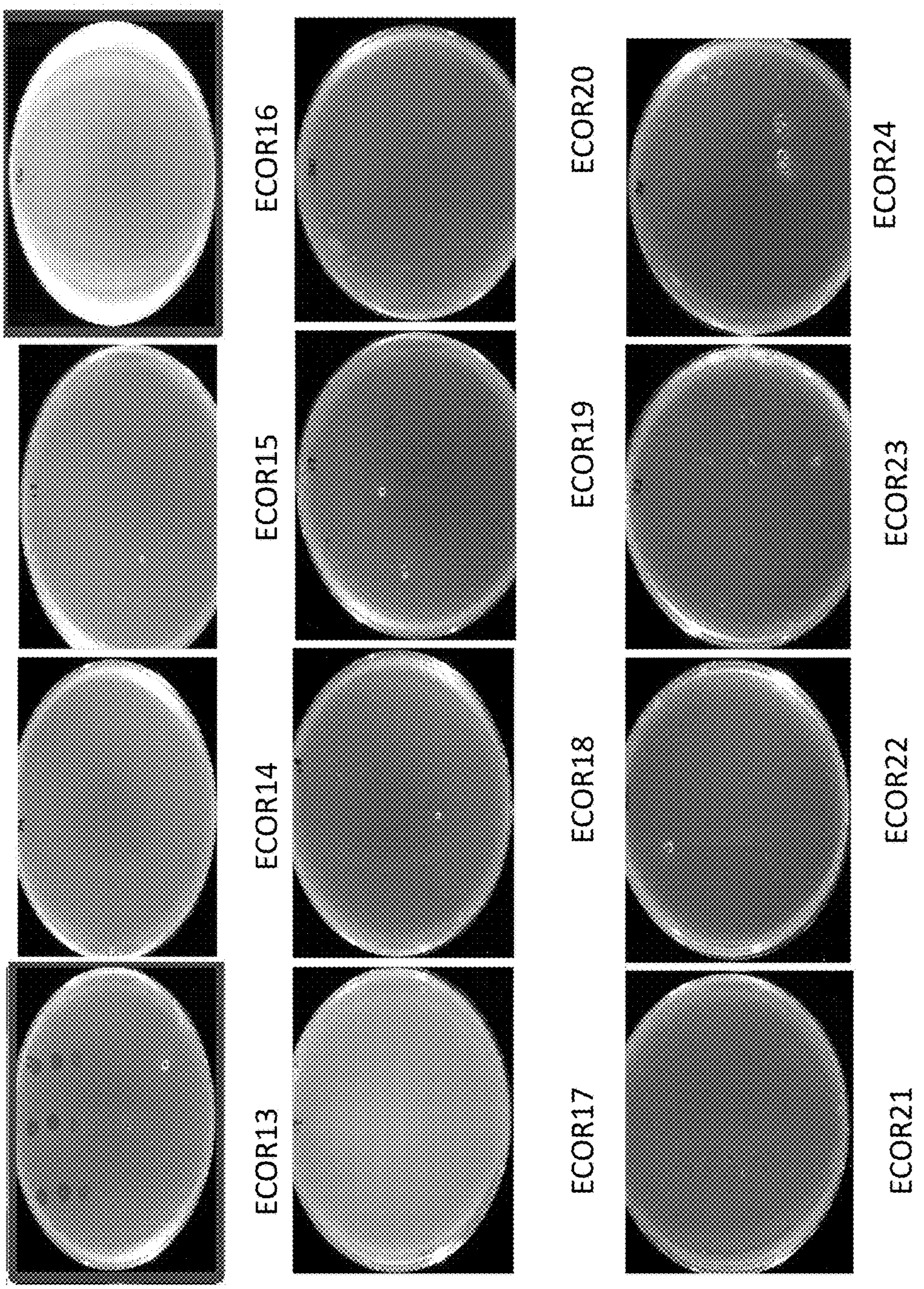
FIG. 17B shows the results of DLA assays run on strains 13 through 24 of the ECOR collection to compare with the screening done with part of the ECOR collection in accordance with the general inventive concepts.
Figure 17C:
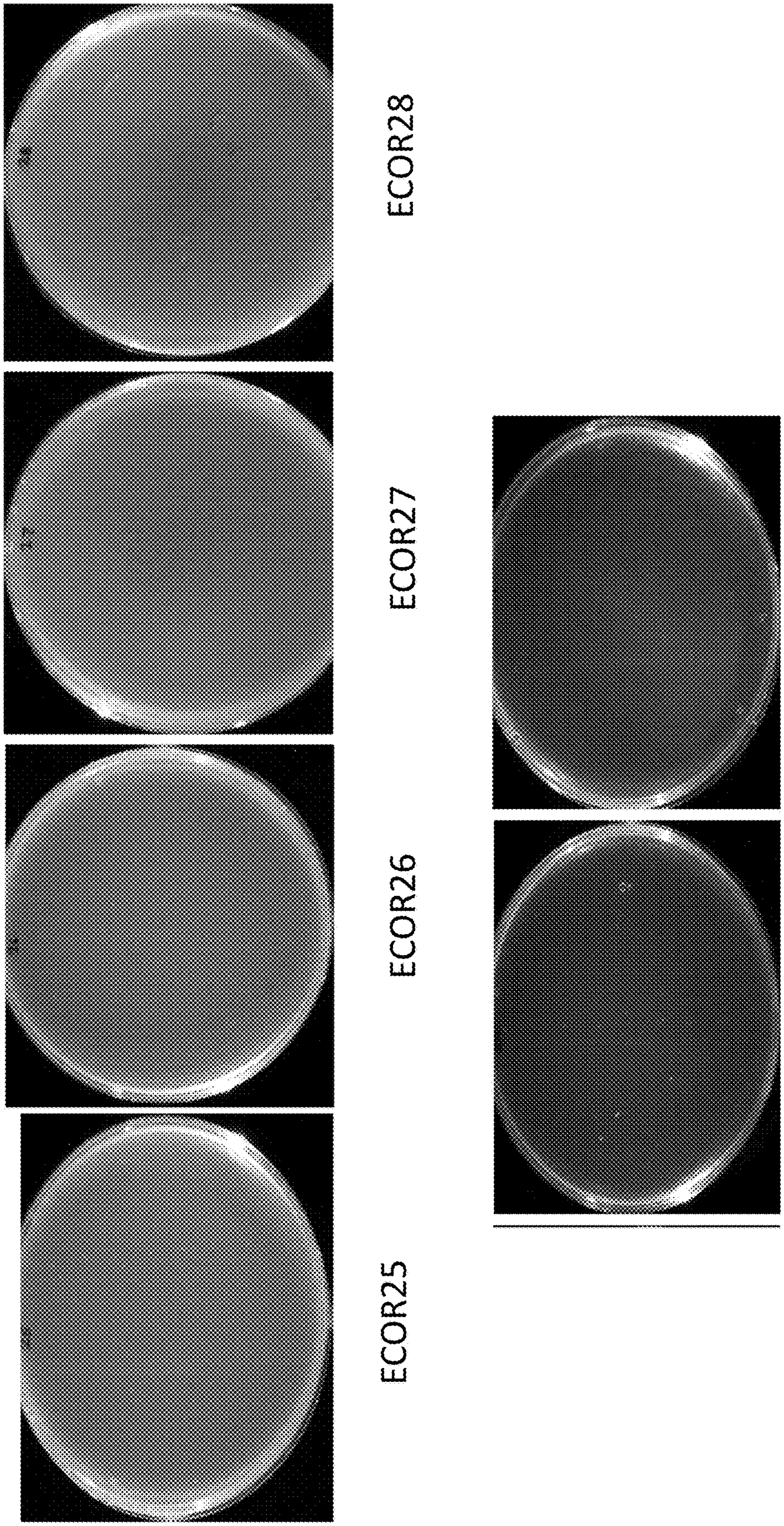
FIG. 17C shows the results of DLA assays run on strains 25 through 30 of the ECOR collection to compare with the screening done with part of the ECOR collection in accordance with the general inventive concepts.

FIG. 17A shows the results of DLA assays run on strains 1 through 12 strains of the ECOR collection. FIG. 17B shows the results of DLA assays run on strains 13 through 24 of the ECOR collection. FIG. 17C shows the results of DLA assays run on strains 25 through 30 of the ECOR collection. Three sensitive strains were identified (highlighted by boxes): ECOR-04, ECOR-13, and ECOR-16. Wild type T7 phage was utilized for these assays.

Figure 18A:
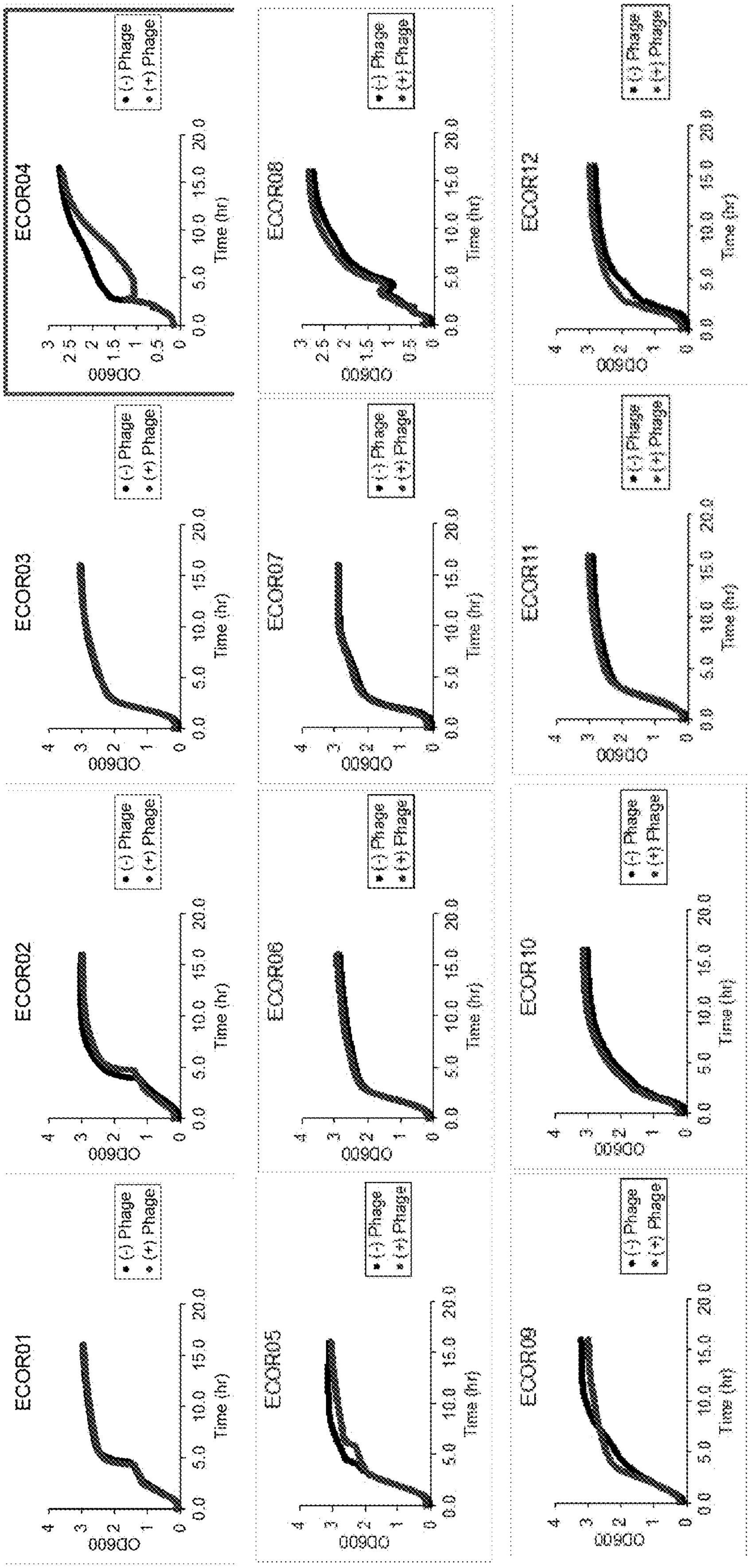
FIG. 18A shows the results of kinetic growth assays run on strains 1 through 12 of the ECOR collection.
Figure 18B:
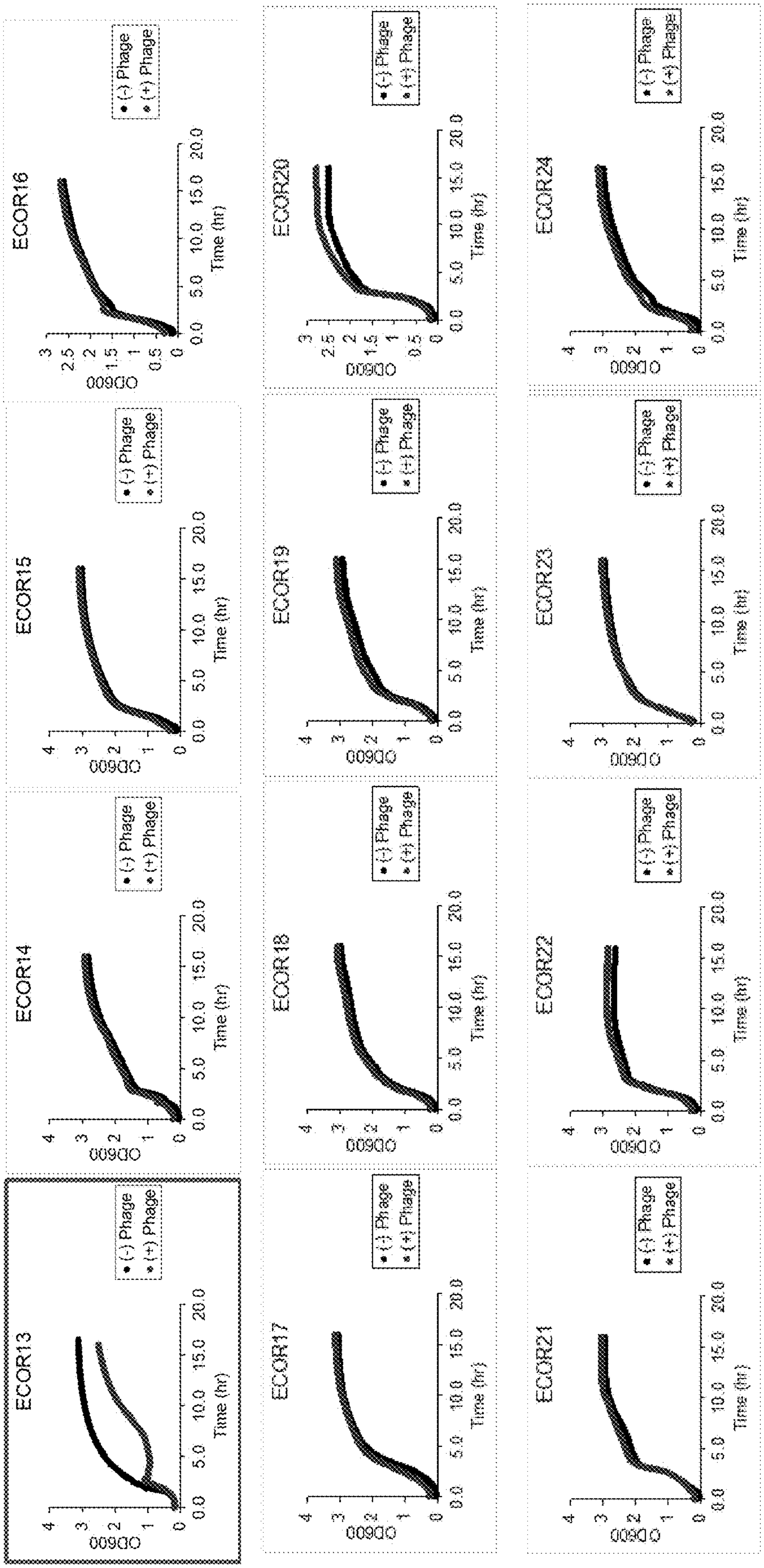
FIG. 18B shows the results of kinetic growth assays run on strains 13 through 24 of the ECOR collection.
Figure 18C:
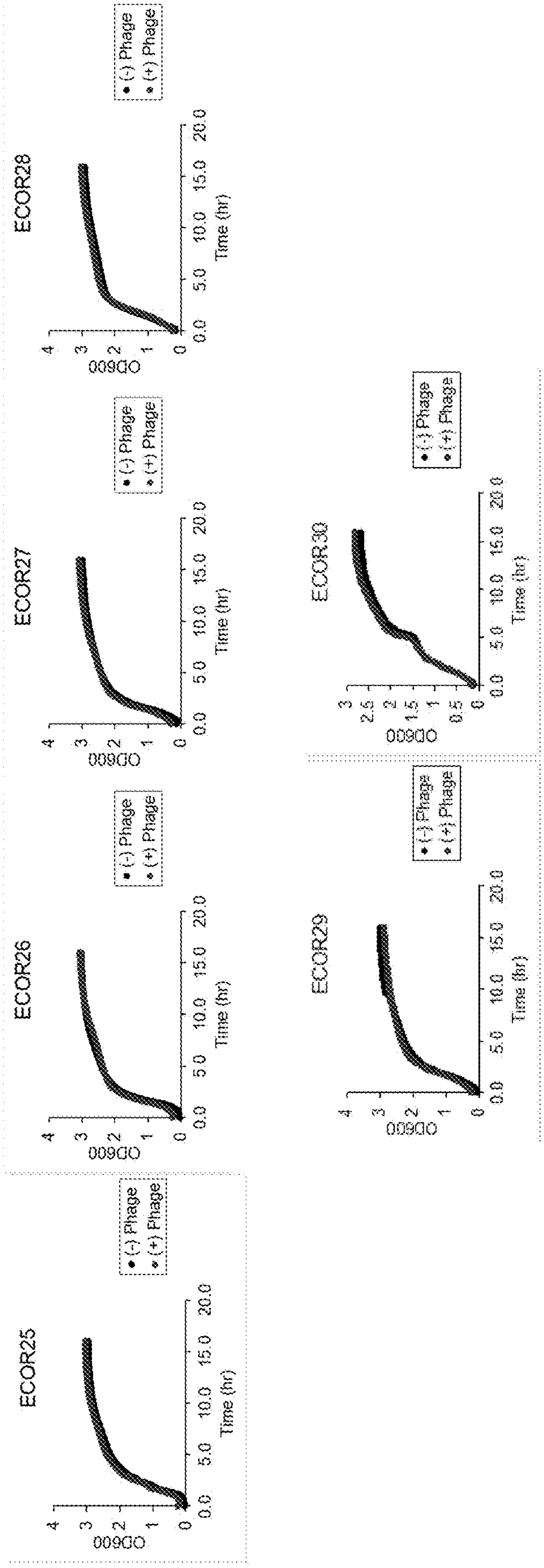
FIG. 18C shows the results of kinetic growth assays run on strains 25 through 30 of the ECOR collection.

FIG. 18A shows the results of kinetic growth assays run on strains 1 through 12 of the ECOR collection. FIG. 18B shows the results of kinetic growth assays run on strains 13 through 24 of the ECOR collection. FIG. 18C shows the results of kinetic growth assays run on strains 25 through 30 of the ECOR collection.

The kinetic growth assays run on the first thirty strains of the ECOR collection only showed ECOR-04 and ECOR-13, highlighted by boxes, as being sensitive. A red line indicates bacterial strains that were introduced to phages. A black line indicates samples only including bacteria. A summary of binding and lysis sensorgrams resulting from screening part of the ECOR collection are shown in FIGS. 19A through 19F.

Figure 19A:
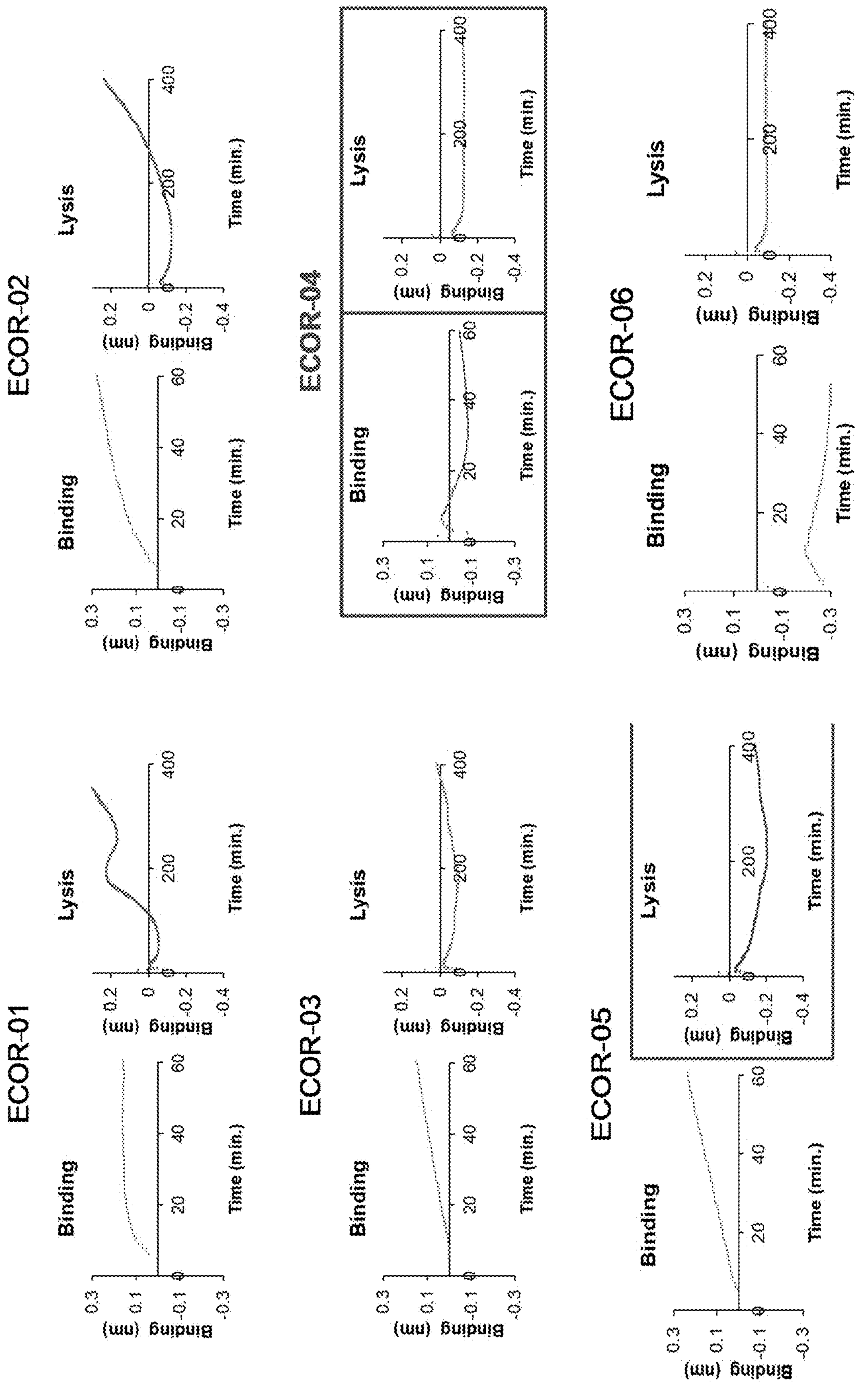
FIG. 19A depicts a summary of binding and lysis sensorgrams resulting from testing strains 1 through 6 of the ECOR collection via the disclosed systems and methods, in accordance with the general inventive concepts.
Figure 19B:
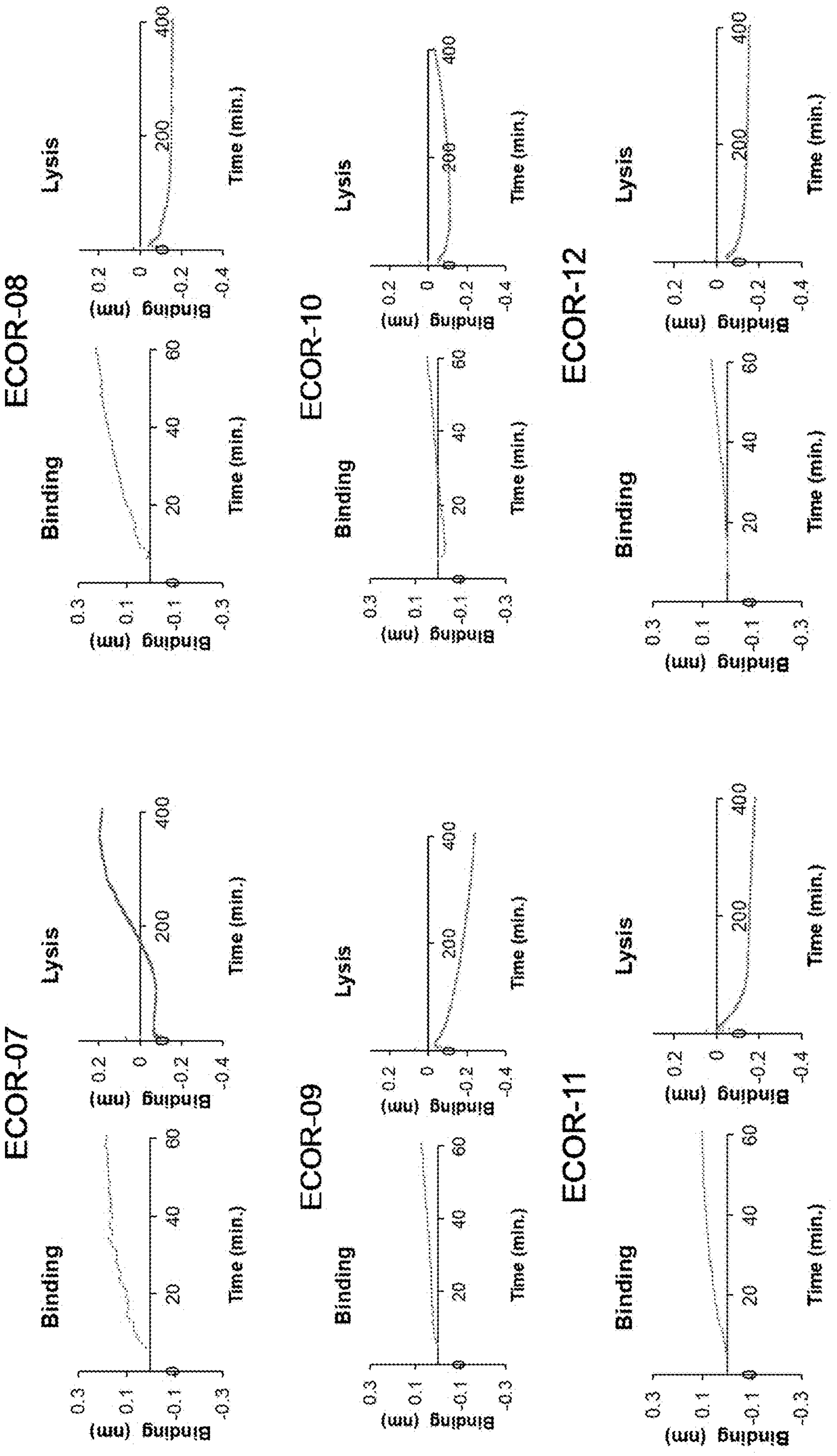
FIG. 19B depicts a summary of binding and lysis sensorgrams resulting from testing strains 7 through 12 of the ECOR collection via the disclosed systems and methods, in accordance with the general inventive concepts.
Figure 19C:
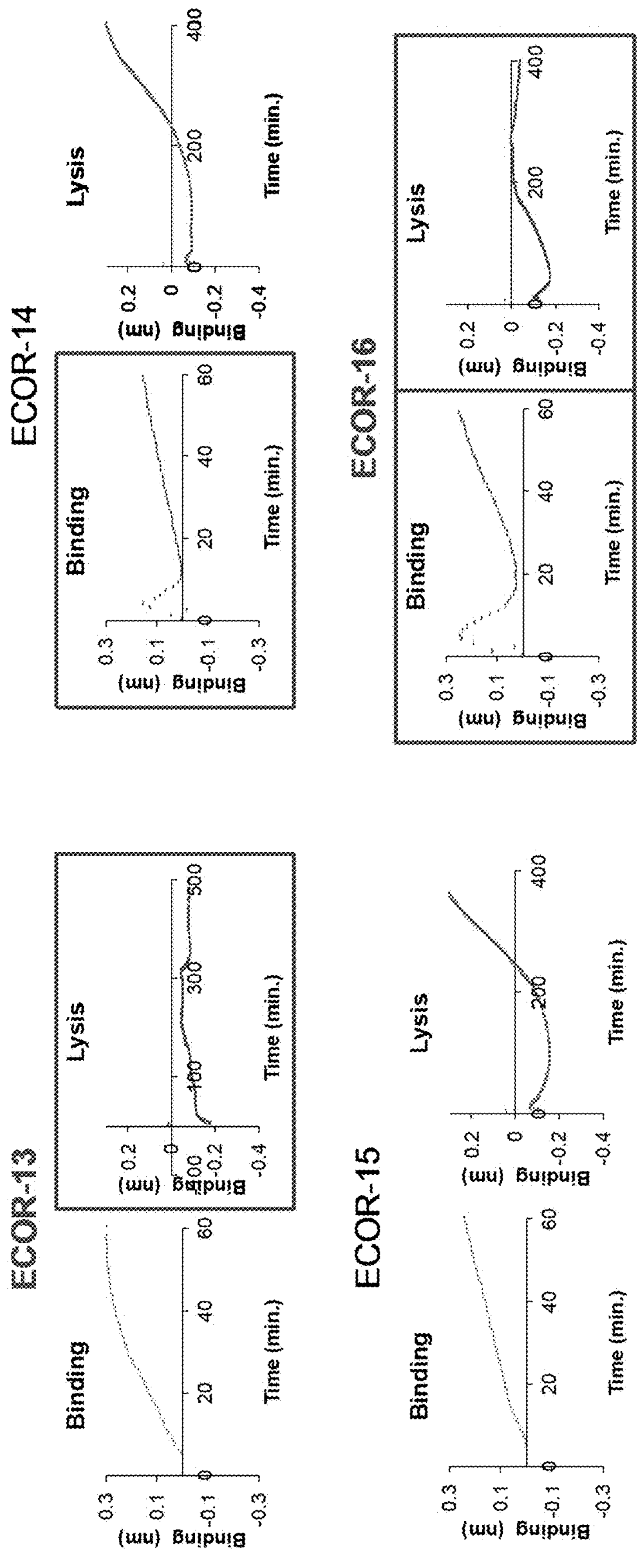
FIG. 19C depicts a summary of binding and lysis sensorgrams resulting from testing strains 13 through 16 of the ECOR collection via the disclosed systems and methods, in accordance with the general inventive concepts.
Figure 19D:
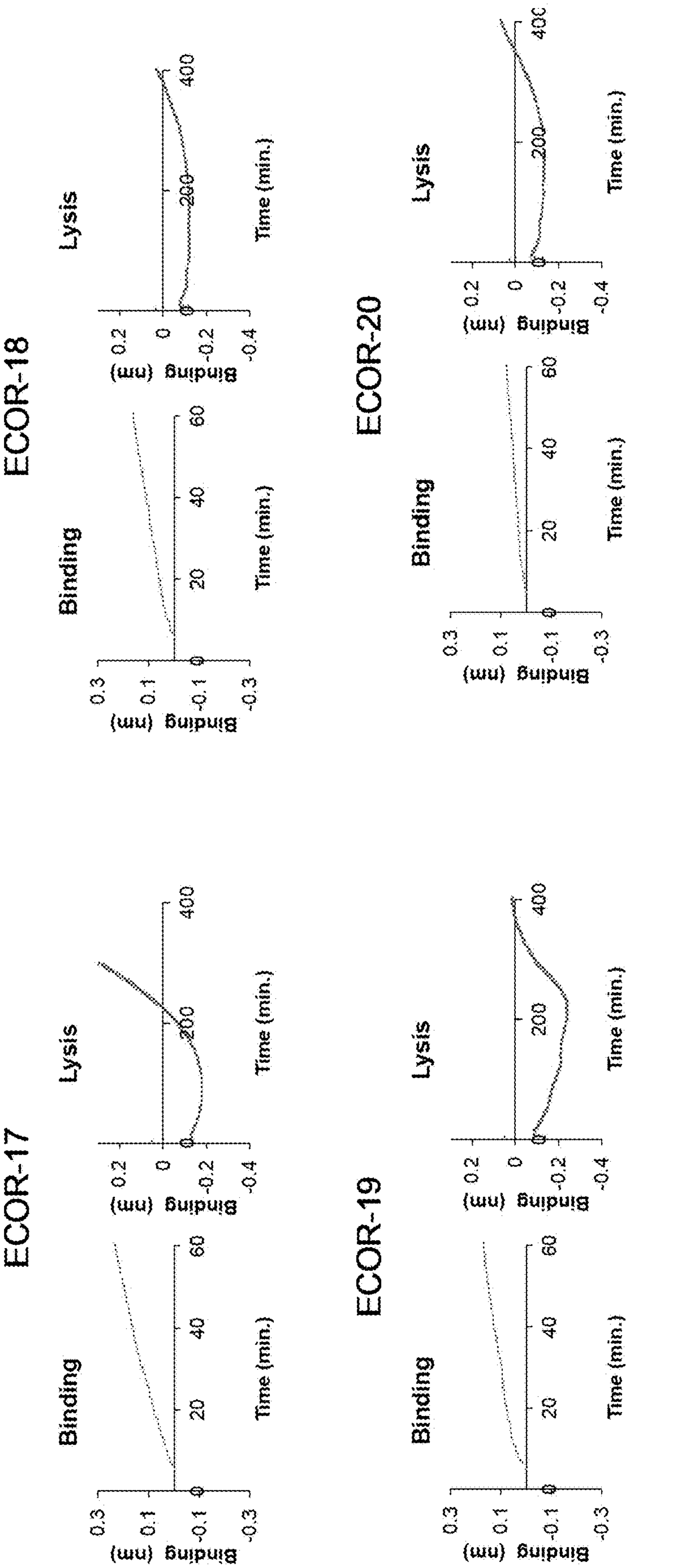
FIG. 19D depicts a summary of binding and lysis sensorgrams resulting from testing strains 17 through 20 of the ECOR collection via the disclosed systems and methods, in accordance with the general inventive concepts.
Figure 19E:
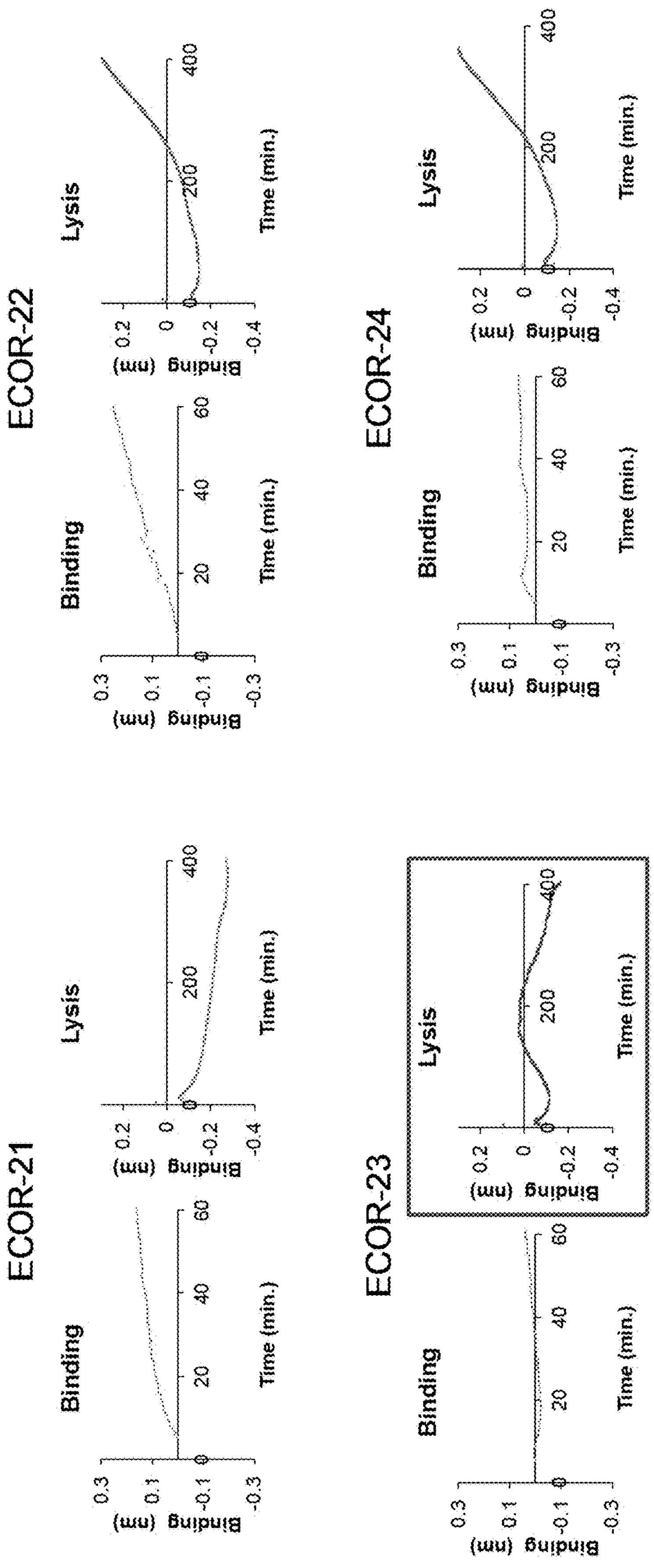
FIG. 19E depicts a summary of binding and lysis sensorgrams resulting from testing strains 21 through 24 of the ECOR collection via the disclosed systems and methods, in accordance with the general inventive concepts.
Figure 19F:
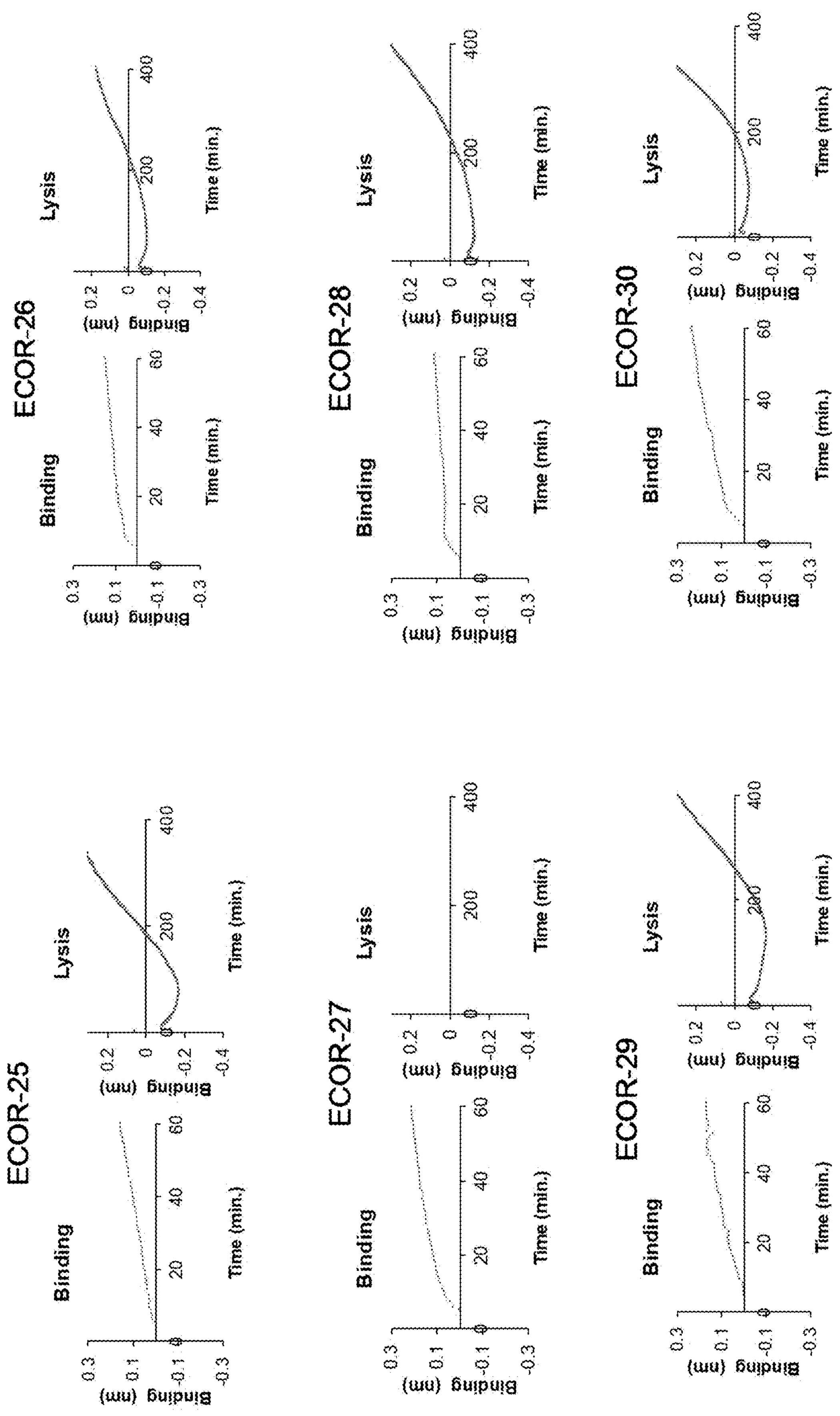
FIG. 19F depicts a summary of binding and lysis sensorgrams resulting from testing strains 25 through 30 of the ECOR collection via the disclosed systems and methods, in accordance with the general inventive concepts.

FIG. 19A depicts a summary of binding and lysis sensorgrams resulting from testing strains 1 through 6 of the ECOR collection via the disclosed systems and methods, in accordance with the general inventive concepts. FIG. 19B depicts a summary of binding and lysis sensorgrams resulting from testing strains 7 through 12 of the ECOR collection via the disclosed systems and methods, in accordance with the general inventive concepts. FIG. 19C depicts a summary of binding and lysis sensorgrams resulting from testing strains 13 through 16 of the ECOR collection via the disclosed systems and methods, in accordance with the general inventive concepts. FIG. 19D depicts a summary of binding and lysis sensorgrams resulting from testing strains 17 through 20 of the ECOR collection via the disclosed systems and methods, in accordance with the general inventive concepts. FIG. 19E depicts a summary of binding and lysis sensorgrams resulting from testing strains 21 through 24 of the ECOR collection via the disclosed systems and methods, in accordance with the general inventive concepts. FIG. 19F depicts a summary of binding and lysis sensorgrams resulting from testing strains 25 through 30 of the ECOR collection via the disclosed systems and methods, in accordance with the general inventive concepts.

Criteria to distinguish between insensitive strains (bacteria that do not bind or bacteria that bind but do not lyse), resistant strains (bacteria that bind and lyse but continue to grow), and sensitive strains (bacteria that lyse) are show in Table 1.

TABLE 1

| Sensitive Strains | Insensitive Strains | Resistant Strains |
|---|---|---|
| Fast lysing: bacteria with fast binding followed by a sudden decrease in signal due to lysis during the bacterial "binding step" (overall negative slope during binding)<br>Slow lysing: bacteria with strong binding (slope > 0.005) and decreasing lysis signal (slope < 0.0001) showing the sigmoidal lysis | Bacteria with weak binding (slope < 0.002) and decreasing signal for lysis (negative slope without the sigmoidal lysis pattern, $R^2 > 0.5$) | Bacteria with strong binding (slope > 0.002) and increasing signal during the lysis step (positive slope) |

TABLE 1-continued

| Sensitive Strains | Insensitive Strains | Resistant Strains |
|---|---|---|
| pattern indicated by a low $R^2$ value ($R^2 < 0.5$) | | |

A rapid binding signal followed by a sudden drop is indicative of strong binding and sudden lysis, which is observed for ECOR-04, ECOR-14, and ECOR16. Strains that produced a negative slope during the lysis step and had a poor $R^2$ fit, accounting for increasing signal due to morphological changes and subsequent lysis, were also classified as sensitive strains (ECOR-04, ECOR-05, ECOR-13, ECOR-16, and ECOR-23). Strains that had weak binding also showed a negative slope during the lysis step due to bacterial disassociation, but had a strong linear fit ($R^2>0.5$). This enabled differentiating insensitive strains from sensitive strains that lysed.

This experiment also identified other potentially sensitive strains: ECOR-05, ECOR-14 and ECOR-23, and possible explanations for why T7 sensitivity was not detected in the DLA or kinetic growth curve assays. For example, ECOR-14 showed lysis during the binding step (i.e., a rapid increase in signal followed by sudden decrease in signal), but then shows regrowth (green line), indicating resistance. ECOR-23 shows a clear lysis signal during the lysis step, but has very weak binding, so if binding can be improved, T7 potentially can infect it more effectively. ECOR-05 shows medium to strong binding and a lysis signal.

Together, these results highlight the present invention's capability to measure phage-host range and readily compare phage infection parameters, such as host binding kinetics and latency period, enabling a more standardized process to screen phage candidates. Additionally, this assay can be used to measure phage interactions with host (e.g., human patient) immune systems and can be carried out in biological samples, including mammal and human biological samples, to better predict efficacy of phage therapy.

Measuring Label-Free Phage Dynamics

One exemplary embodiment of the present invention requires ultracentrifugation, which is not compatible with all phage types. In yet another experiment, the ability to measure phage dynamics of non-biotinylated phages, without ultracentrifugation, was demonstrated.

Figure 20:
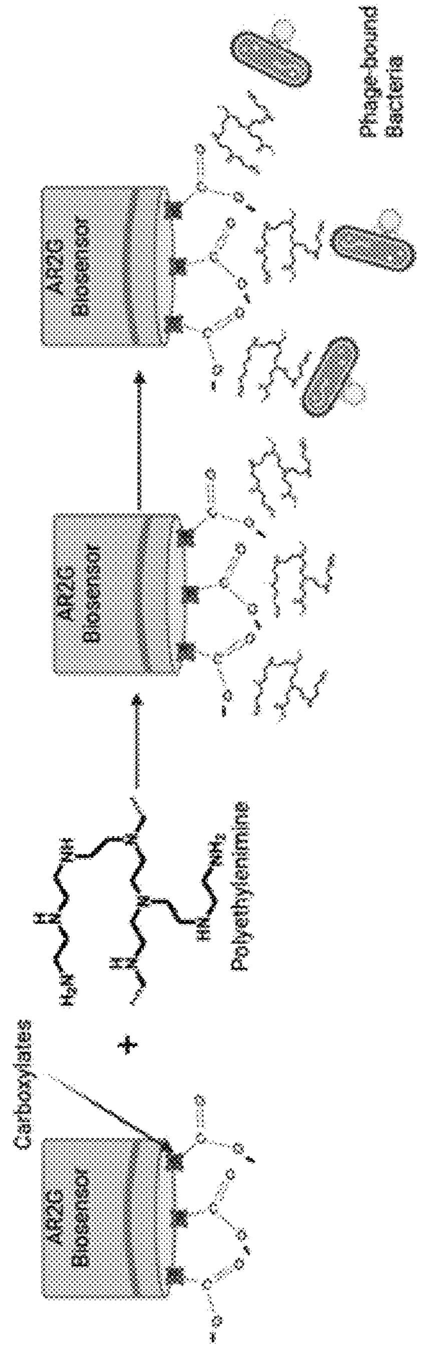
FIG. 20 is a schematic depicting sensor loading and bacterial capture as part of the study of label-free phage dynamics, in accordance with the general inventive concepts.

To test this, amine reactive $2^{nd}$ generation sensors (e.g., OctetRAR2G) were used with positively charged polethylenimine ("PEI") polymer (MW: 10,000 g/mol) as shown in FIG. 20. These sensors have a carboxylated surface and are negatively charged, to capture BW25113 bound with phage. BW25113 binds to the sensor with PEI because *E. coli* has a net negative surface charge and associates with positively charged surfaces through ionic interactions. PEI was used because the surface charge can be tuned depending on the amount of PEI used for sensor functionalization. This is important as a surface with too high a zeta potential is antimicrobial and will result in bacterial lysis.

Figure 21:
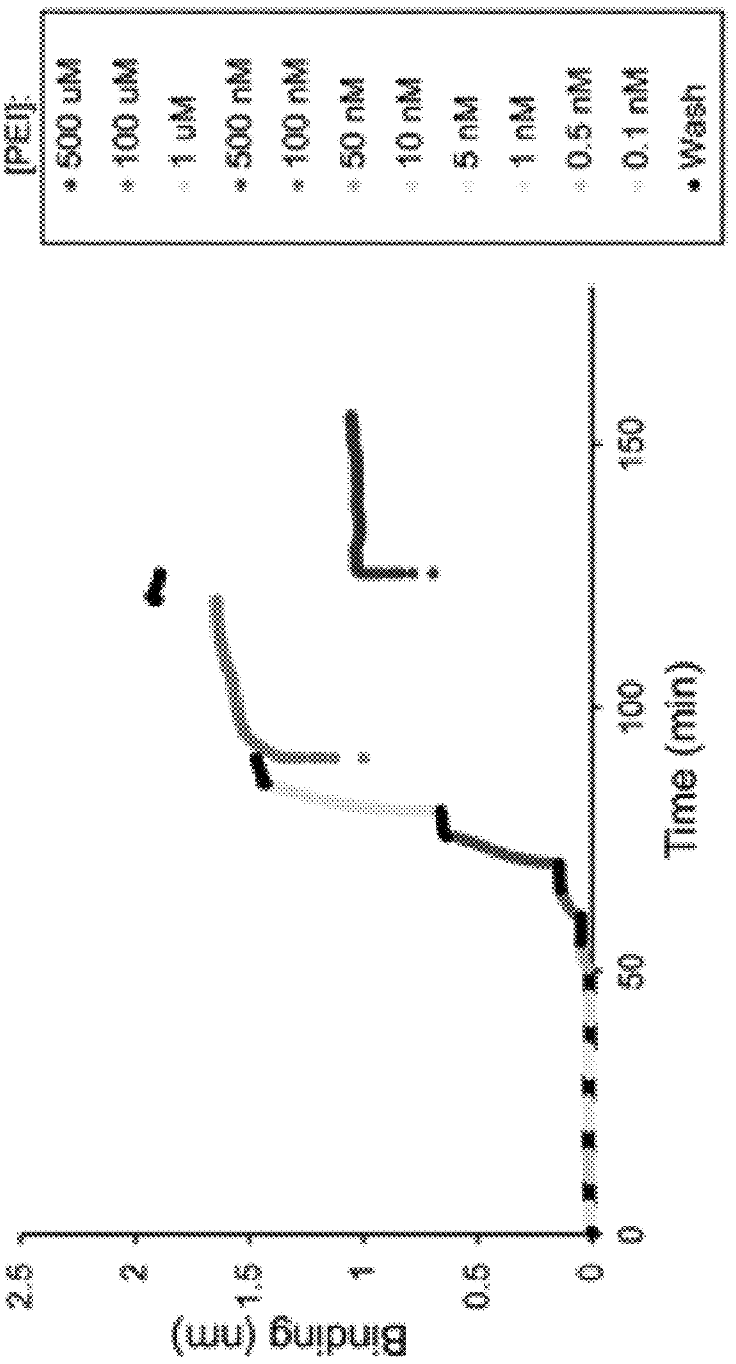
FIG. 21 depicts a sensorgram showing titration of PEI regarding its attachment onto AR2G sensors at varying concentrations, in accordance with the general inventive concepts.

Titration of varying concentrations of PEI was tested, spanning 0.1 nM to 500 μM PEI, to determine the optimal quantity of PEI and if PEI binds irreversibly to these sensors, with wash steps in between, shown in FIG. 21. Since no loss in signal was observed during the wash steps, it is determined that PEI binds irreversibly to the sensor surface and is stable.

Figure 22:
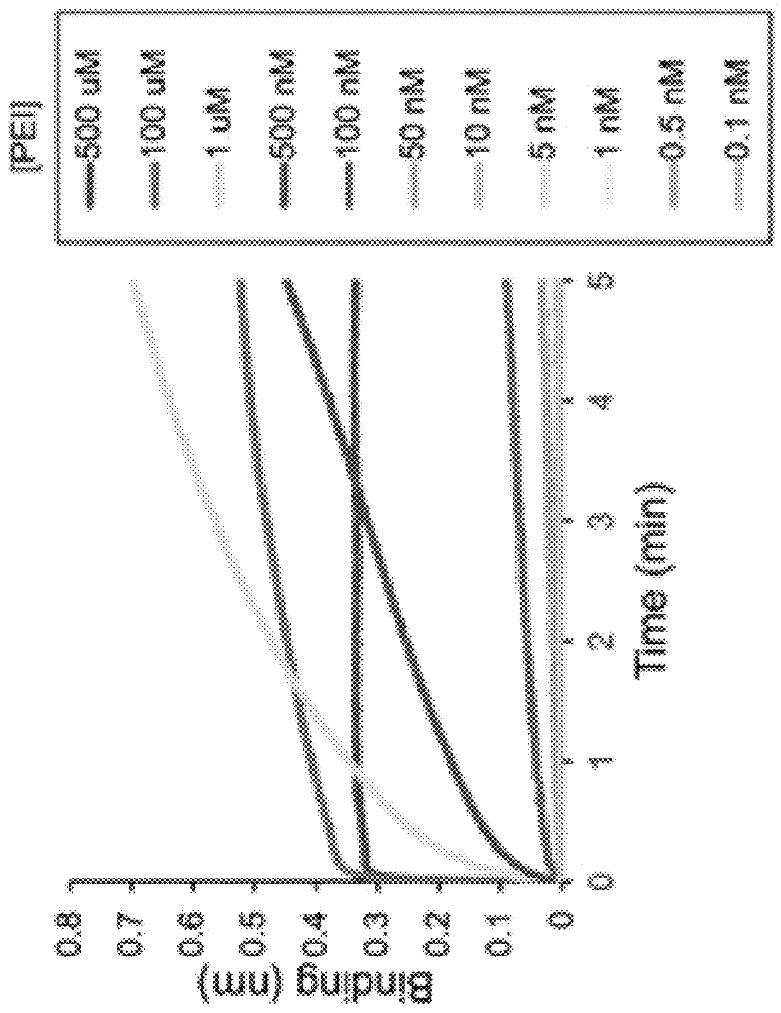
FIG. 22 depicts overlayed sensorgrams of the PEI titrations, showing only the PEI attachment steps, in accordance with the general inventive concepts.

The resulting sensorgrams showing only the PEI application steps, shown in FIG. 22, using various concentrations of PEI were overlaid to better compare the amount of PEI functionalization.

Figure 23:
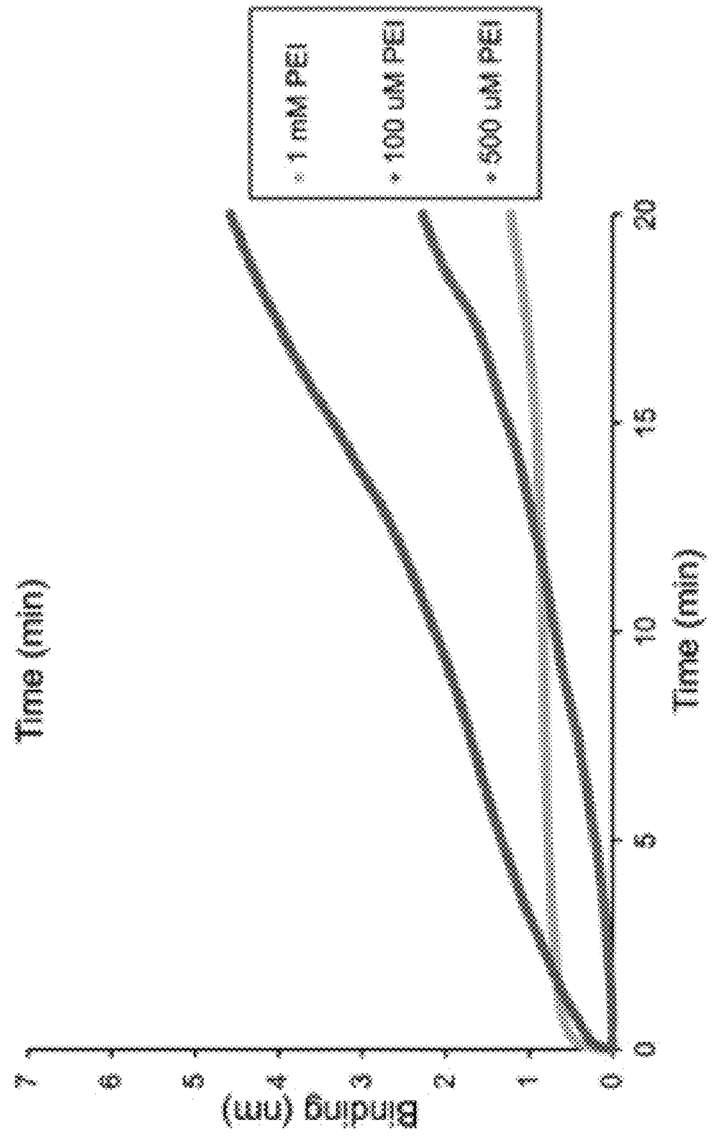
FIG. 23 shows overlayed sensorgrams showing BW25113 immobilized to AR2G sensors with varying concentrations of PEI, in accordance with the general inventive concepts.

As shown in FIG. 23, the optimal PEI concentration for bacterial capture was empirically determined by carrying out bacterial binding assays and monitoring the signal over time. The optimal PEI concentration was determined to be 100 μM, as these sensors had the fastest bacterial capture kinetics and produced the largest binding signal, where higher concentrations of PEI resulted in slower binding kinetics and lower signal, most likely due to bacterial lysis.

Figure 24:
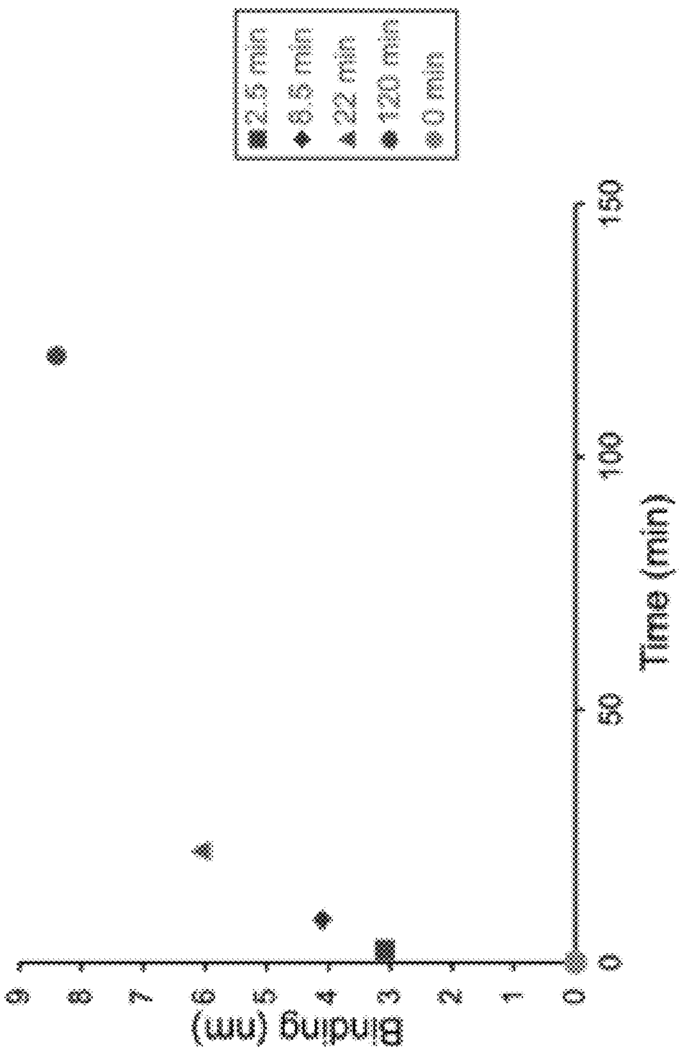
FIG. 24 depicts a plot summarizing the maximum binding signal for BW25113 association to functionalized sensors with PEI at varying time points, compiled from five independent experiments, in accordance with the general inventive concepts.

To assess the reproducibility, binding signals for bacterial association were measured from five independent experiments at varying time points and compiled into a single plot as depicted in FIG. 24. This analysis showed that the bacterial capture is highly reproducible, showing saturation in bacterial binding after about 120 minutes.

Next, phage lysis dynamics were studied by mixing wild-type T7 (unlabeled) with BW25113 for 15 minutes at an MOI of 2, washing with PBS (four times), and loading onto the PEI-coated sensor to observe binding and lysis dynamics at 37° C. In the first 5 minutes, a rapid increase in binding signal was observed, attributed to binding of small negatively charged biomolecules, as they have much faster diffusion than bacteria.

This phase is followed by a slow and steady increase in bacterial association, which is followed by a sudden increase in signal after about 40 minutes. This rapid increase in signal is hypothesized to be due to phage-induced lysis, releasing negatively charged biomolecules that then bind to the positively charged sensor surface. This results in a "turn on" lysis signal, compared to the "turn-off" lysis signal observed with the SA sensor.

Figure 25:
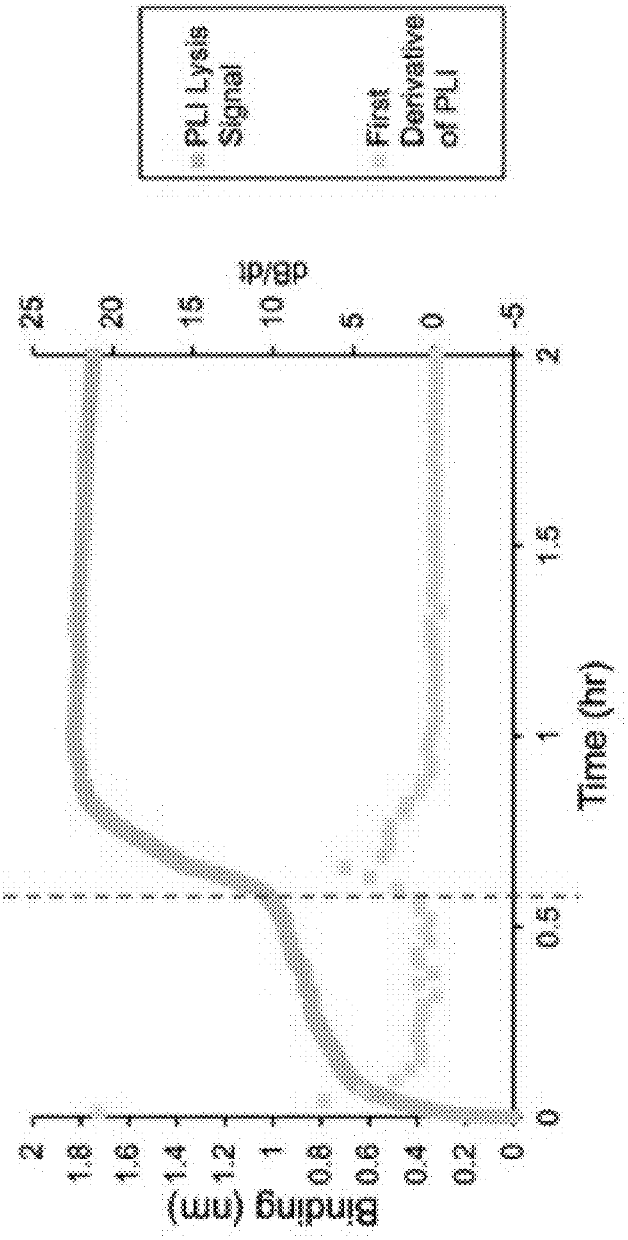
FIG. 25 shows bacterial binding and lysis of BW25113 by label-free T7 overlayed with a first derivative curve, in accordance with the general inventive concepts.

As shown in FIG. 25, the lysis time was quantitatively assessed by taking the first derivative of the signal curves of FIG. 25, and finding the time when the rate of change begins to rapidly increase. The lysis time was measured to be about 37 minutes and is indicated by a dotted line. The phage lysis time is much faster at 37° C. compared to room temperature, which was previously measured to be 235 min. (see FIG. 12).

Figure 26:
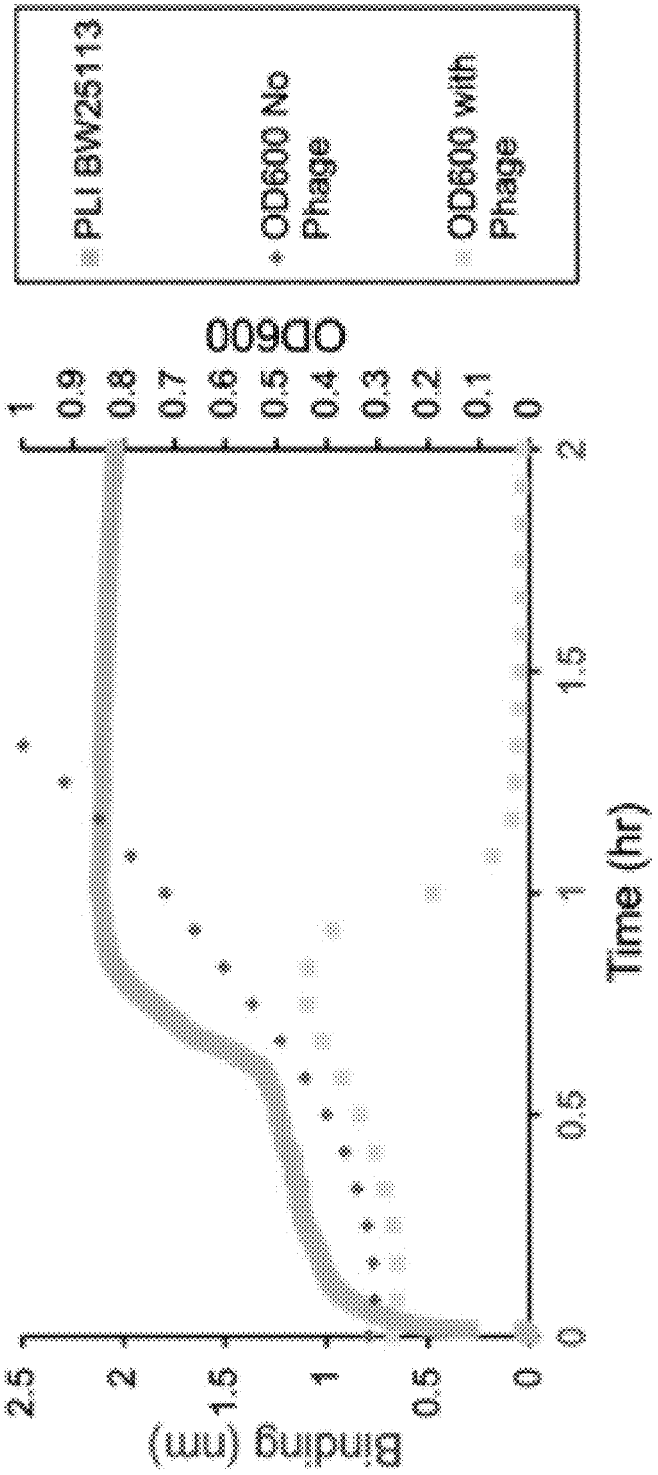
FIG. 26 depicts overlayed sensorgrams showing bacterial lysis for BW25113, compared to spectroscopic BW25113 growth curves with and without T7, in accordance with the general inventive concepts.

To corroborate that the rapid signal increase is due to phage-induced lysis, bacterial growth was monitored spectroscopically using a plate reader, which was overlaid with the sensorgram. FIG. 26 depicts overlayed sensorgrams showing bacterial lysis for BW25113, compared to spectroscopic BW25113 growth curves with and without T7. The rapid loss in optical density (OD600) correlates with the increased signal, confirming that the rapid signal increase is due to lysis. Additionally, this assay can be used to measure phage interactions with host (e.g., human patient) immune systems and can be carried out in biological samples, including mammal and human biological samples to better predict efficacy of phage therapy. Together, these results show that the present invention can be used to monitor phage-host dynamics of label-free phages, without requiring biotin functionalization and without ultracentrifugation.

Detecting Bacterial Contamination

Figure 27:
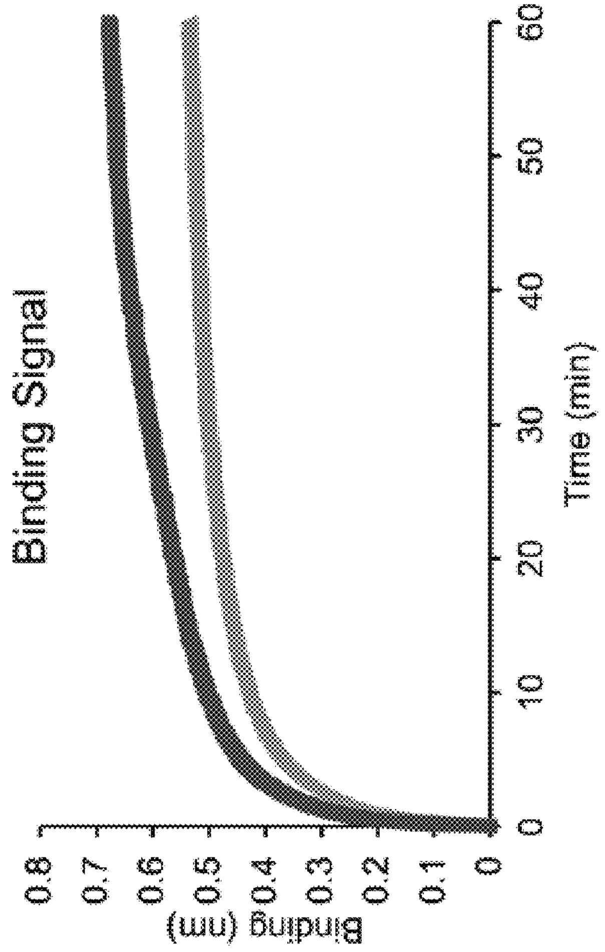
FIG. 27 depicts overlayed sensorgrams showing binding signal of contaminated baby formula compared to non-contaminated formula, in accordance with the general inventive concepts.

In yet another experiment, the ability to demonstrate the detection of bacterial contamination in complex media was demonstrated using baby formula. Baby formula was selected to study as it is opaque and difficult to analyze with traditional spectroscopic methods. To test whether the present invention can detect bacterial contamination in real-time, a sensor functionalized with T7 was submerged into contaminated baby formula and the resulting sensorgram was compared to formula only control. A significant binding signal is seen in both samples, however, binding is much larger for the contaminated baby formula, as shown in FIG. 27. To confirm that the signal is not a false-positive, sensors were washed to remove any nonspecifically bound material and then incubated in LB to observe lysis dynamics, or lack thereof.

Figure 28:
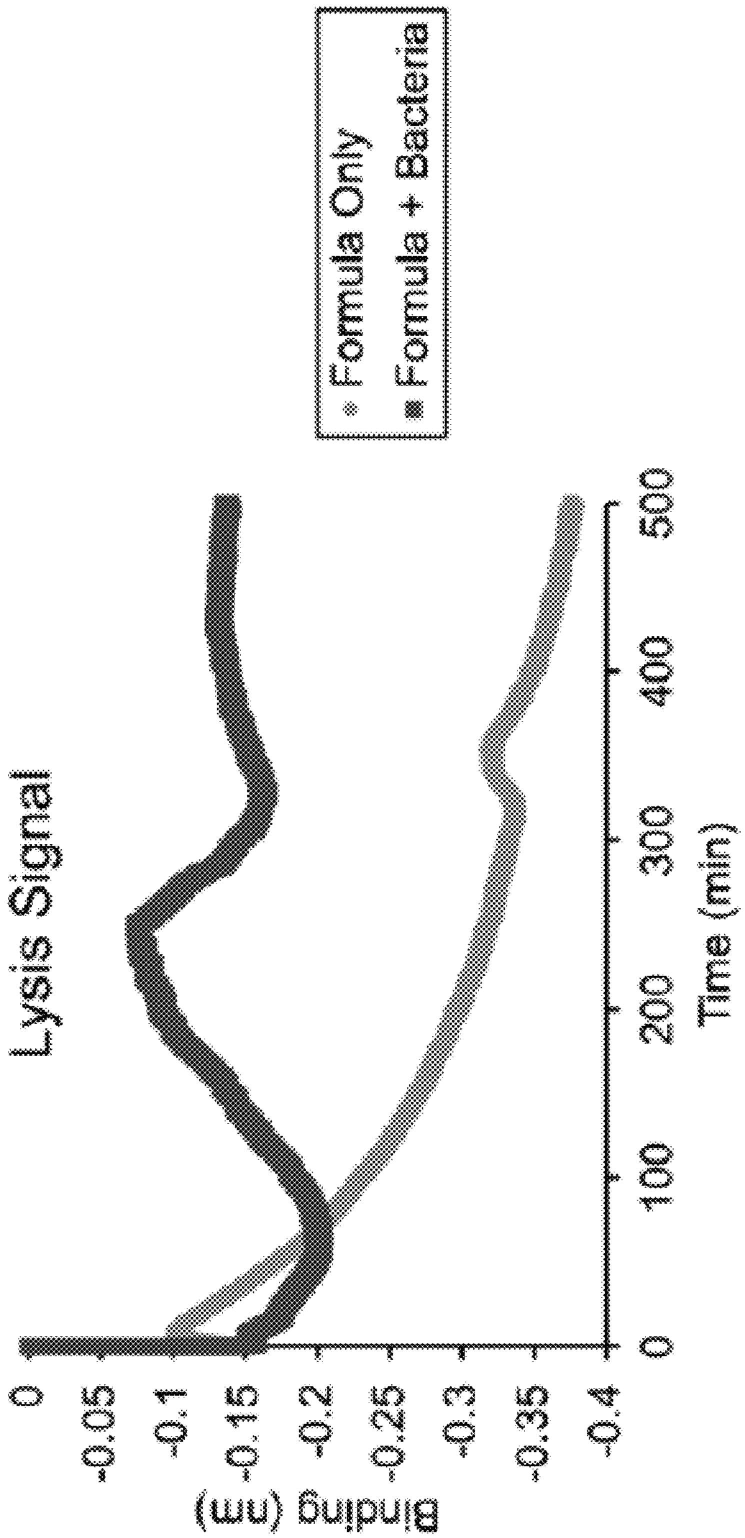
FIG. 28 depicts overlayed sensorgrams showing lysis signal of contaminated formula compared to non-contaminated formula, in accordance with the general inventive concepts.

FIG. 28. depicts overlayed sensorgrams showing lysis signal of contaminated formula compared to noncontaminated formula. Similar to the lysis signature observed previously (see FIG. 12), contaminated formula showed (i) an initial decrease in signal, resulting from bacterial dissociation; (ii) followed by an increase in signal; (iii) and then a sudden decrease in signal due to lysis. Moreover, lysis was observed within the same time as before, about 220 minutes. Whereas the non-contaminated formula controls only show a dissociation signal of nonspecifically bound molecules from the sensor surface as shown in FIG. 28.

The present invention detected bacterial contamination of baby formula in less than five minutes, and confirmed it was a positive signal rather than a false positive signal by observing the lysis signature. This is 200 times faster than traditional microbiology bacterial enumeration assays, which take 18 hours.

This exemplary assay is a targeted assay, meaning knowledge of the specific bacterial contaminate is required. However, sensor arrays can easily be engineered to detect a wide panel of possible pathogen contaminates.

While the present invention and associated inventive concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

We claim:

1. A method of measuring phage-host dynamics and parameters using bacteriophage infection of a bacteria comprising:

providing a sensor with a tip;

attaching and immobilizing to the sensor a plurality of bacteriophages having a phage-host range to obtain a functionalized sensor;

irradiating the functionalized sensor with light and detecting and obtaining in real-time an at least one wavelength of white light reflected by the tip of the functionalized sensor with the bacteriophages attached thereto and corresponding to a baseline interference pattern measurement;

contacting the functionalized sensor with a capture medium comprising a liquid mixture further comprising an at least one host;

irradiating the functionalized sensor with light, such that if the bacteriophages bind to the at least one host, the binding of the bacteriophages to the at least one host shifts the baseline interference pattern measurement;

detecting and obtaining in real-time a modified interference pattern measurement, wherein the modified interference pattern measurement comprises a measurement of the at least one wavelength of white light reflected from the tip of the functionalized sensor as shifted by the bacteriophages and the at least one host attached thereto;

comparing the modified interference pattern measurement to the baseline interference pattern measurement to produce a sensorgram;

wherein a binding signal and a lysis signal are detected, wherein the binding signal comprises an amount of the at least one host bound to the bacteriophages and the lysis signal comprises an amount of the at least one host bound to the bacteriophages while the at least one host is being lysed by the bacteriophages;

screening the phage-host range from the sensorgram.

2. The method of claim 1, further comprising irradiating the tip of the sensor and detecting a control measurement, wherein the control measurement is a measurement of the at least one wavelength of white light reflected by the tip of the sensor before the obtaining of the functionalized sensor.

3. The method of claim 1, wherein the at least one host comprises a bacteria.

4. The method of claim 1, wherein the at least one host comprises a biological sample.

5. The method of claim 1, further comprising measuring a lysis time by determining a first local maxima of the sensorgram and by taking a first derivative of the lysis signal and determining when the first derivative is equal to zero, and further comprising measuring a latency period by determining a first local maxima of the sensorgram and by taking a first derivative of the lysis signal and determining when the first derivative is equal to zero.

6. The method of claim 1, further comprising washing the functionalized sensor tip with a buffer after the bacteriophages bind to the at least one host.

7. The method of claim 1, further comprising biotinylating the bacteriophage before they are attached to the functionalized sensor, attaching streptavidin to the sensor tip, and attaching the bacteriophages to the functionalized sensor tip via biotin-streptavidin bioconjugation.

8. The method of claim 1, further comprising comparing the modified interference pattern measurement to a second modified interference pattern measurement produced by a second host.

9. A system for measuring phage-host dynamics and parameters using bacteriophage infection of a bacteria comprising:

a sensor having a tip; a host attached and immobilized to the sensor tip to form a functionalized sensor;

wherein when the functionalized sensor is irradiated with light, an at least one wavelength of white light is reflected by the tip of the functionalized sensor with the host attached thereto, corresponding to a baseline interference pattern measurement;

a capture medium comprising a liquid mixture of bacteriophages provided to the functionalized sensor, the bacteriophages having a phage-host range;

wherein if the host is within the phage-host range of the bacteriophages, the bacteriophages bind to the host;

wherein the binding of the bacteriophages to the host shifts the baseline interference pattern measurement to form a modified interference pattern measurement, wherein the modified interference pattern measurement comprises a measurement of the at least one wavelength of white light reflected from the tip of the functionalized sensor with as shifted by the host and the bacteriophages attached thereto;

a comparison of the modified interference pattern measurement to the baseline interference pattern measurement, the comparison comprising a sensorgram;

wherein, if the host is within the phage-host range of the bacteriophages, a binding signal and a lysis signal are detected, wherein the binding signal comprises an amount of the at least one host bound to the bacteriophages and the lysis signal comprises an amount of the at least one host bound to the bacteriophages while the at least one host are is being lysed by the bacteriophages, and the phage-host range is screened.

10. The system of claim 9, wherein the host comprises a bacteria.

11. The system of claim 9, wherein the host comprises a biological sample.

12. The system of claim 9, wherein the host further comprises a monolayer on the tip of the functionalized sensor.

13. The system of claim 9, wherein a lysis time is measured by taking a first derivative of the lysis signal and determining a first local maxima.

14. The system of claim 9, wherein a latency period is measured by determining a first local maxima of the sensorgram and by taking a first derivative of the lysis signal and determining when the first derivative is equal to zero.

15. The system of claim 9, further comprising a control measurement, wherein the control measurement is a measurement of the at least one wavelength of white light reflected by the tip of the sensor when the sensor is irradiated with light before the obtaining of the functionalized sensor.

16. The system of claim 9, further comprising a second modified interference pattern measurement produced by a second host, wherein the second modified interference pattern is compared to the modified interference pattern.

17. A method for label-free bacterial detection using bacteriophage infection of a bacteria comprising:

providing a sensor with a tip;

attaching and immobilizing to the sensor a plurality of bacteriophages having a phage-host range to obtain a functionalized sensor;

irradiating the functionalized sensor with light and detecting and obtaining in real-time an at least one wavelength of white light reflected by the tip of the functionalized sensor with the bacteriophages attached thereto and corresponding to a baseline interference pattern measurement;

contacting the functionalized sensor with a capture medium comprising a liquid mixture;

irradiating the functionalized sensor with light, such that if the capture medium comprises an at least one host within the phage-host range of the bacteriophages, the bacteriophages bind to the at least one host, and the binding of the bacteriophages to the at least one host shifts the baseline interference pattern measurement;

detecting and obtaining in real-time a modified interference pattern measurement, wherein the modified interference pattern measurement comprises a measurement of the at least one wavelength of white light reflected from the tip of the functionalized sensor as shifted by the bacteriophages and the at least one host attached thereto;

comparing the modified interference pattern measurement to the baseline interference pattern measurement to produce a sensorgram;

wherein, in the presence of at least one host within the phage-host range of the bacteriophages, a binding signal and a lysis signal are detected, wherein the binding signal comprises an amount of the at least one host bound to the bacteriophages and the lysis signal comprises an amount of the at least one host bound to the bacteriophages while the at least one host is being lysed by the bacteriophages.

18. The method of claim 17, further comprising studying the binding signal and the lysis signal to detect a level of bacterial contamination in the capture medium.

19. The method of claim 17, wherein the at least one host comprises a bacteria.

20. The method of claim 17, further comprising irradiating the tip of the sensor and detecting a control measurement, wherein the control measurement is a measurement of the at least one wavelength of white light reflected by the tip of the sensor before the obtaining of the functionalized sensor.

* * * * *